United States Patent
He et al.

(10) Patent No.: US 10,692,615 B2
(45) Date of Patent: Jun. 23, 2020

(54) SPENT FUEL STORAGE SYSTEM, COMPONENTS, AND METHODS OF USE

(71) Applicant: TN AMERICAS LLC, Columbia, MD (US)

(72) Inventors: Zhaojuan He, Columbia, MD (US); Uwe Wolf, Silver Spring, MD (US); William Bracey, West Orange, NJ (US); Anthony Villaflores, Laurel, MD (US)

(73) Assignee: TN AMERICAS LLC, Columbia, MD (US)

( * ) Notice: Subject to any disclaimer, the term of this patent is extended or adjusted under 35 U.S.C. 154(b) by 416 days.

(21) Appl. No.: 15/505,030

(22) PCT Filed: Aug. 19, 2015

(86) PCT No.: PCT/US2015/045930
§ 371 (c)(1),
(2) Date: Feb. 17, 2017

(87) PCT Pub. No.: WO2016/028911
PCT Pub. Date: Feb. 25, 2016

(65) Prior Publication Data
US 2017/0263343 A1    Sep. 14, 2017

Related U.S. Application Data

(60) Provisional application No. 62/039,361, filed on Aug. 19, 2014.

(51) Int. Cl.
*G21C 19/00*    (2006.01)
*G21C 19/32*    (2006.01)
(Continued)

(52) U.S. Cl.
CPC .............. *G21C 19/32* (2013.01); *G21F 5/008* (2013.01); *G21F 5/14* (2013.01); *G21F 7/005* (2013.01)

(58) Field of Classification Search
CPC . G21C 19/32; G21F 5/008; G21F 5/14; G21F 7/005
See application file for complete search history.

(56) References Cited

U.S. PATENT DOCUMENTS 4,780,269 A  * 10/1988  Fischer .................. G21C 19/07
                                                    220/23.87
5,841,147 A    11/1998  Steinke et al.
(Continued)

FOREIGN PATENT DOCUMENTS

CN      1942377 A      4/2007
CN    102165534 A      8/2011
(Continued)

OTHER PUBLICATIONS

International Preliminary Report on Patentability and Written Opinion of the International Searching Authority, dated Mar. 2, 2017, issued in corresponding International Application No. PCT/US2015/045930, filed Aug. 19, 2015, 12 pages.
(Continued)

*Primary Examiner* — Marshall P O'Connor
(74) *Attorney, Agent, or Firm* — Christensen O'Connor Johnson Kindness, PLLC

(57) ABSTRACT

Embodiments of the present disclosure are directed to systems, components, and methods for transferring canisters containing radioactive material, for example, from a container assembly using a transfer assembly to a horizontal storage module (HSM). Systems in accordance with various embodiments of the present disclosure include, for example, a vertical to horizontal (VTH) transfer station for a canister and method of transfer, a horizontal to horizontal (HTH)
(Continued)

transfer station for a canister and methods of transfer, a transport wagon system for transporting a canister to a horizontal storage module (HSM), and an HSM system for long-term storage of a canister.

23 Claims, 26 Drawing Sheets

(51) Int. Cl.
*G21F 5/14* (2006.01)
*G21F 7/005* (2006.01)
*G21F 5/008* (2006.01)

(56) References Cited

U.S. PATENT DOCUMENTS

| | | |
|---|---|---|
| 2012/0183375 A1 | 7/2012 | Bracey et al. |
| 2013/0322589 A1 | 12/2013 | Bracey et al. |

FOREIGN PATENT DOCUMENTS

| | | |
|---|---|---|
| CN | 104221092 A | 12/2014 |
| JP | 2004069591 A * | 3/2004 |
| JP | 2004069591 A | 3/2004 |
| JP | 2005331359 A | 12/2005 |
| WO | 2012/068547 A2 | 5/2012 |

OTHER PUBLICATIONS

International Search Report dated Dec. 22, 2015, issued in corresponding International Application No. PCT/US2015/045930, filed Aug. 19, 2015, 4 pages.

Written Opinion of the International Searching Authority, dated Dec. 22, 2015, issued in corresponding International Application No. PCT/US2015/045930, filed Aug. 19, 2015, 10 pages.

Notification of the First Office Action dated Jul. 31, 2018, issued in corresponding Chinese Application No. 201580052604.3, filed Aug. 19, 2015, 22 pages.

* cited by examiner

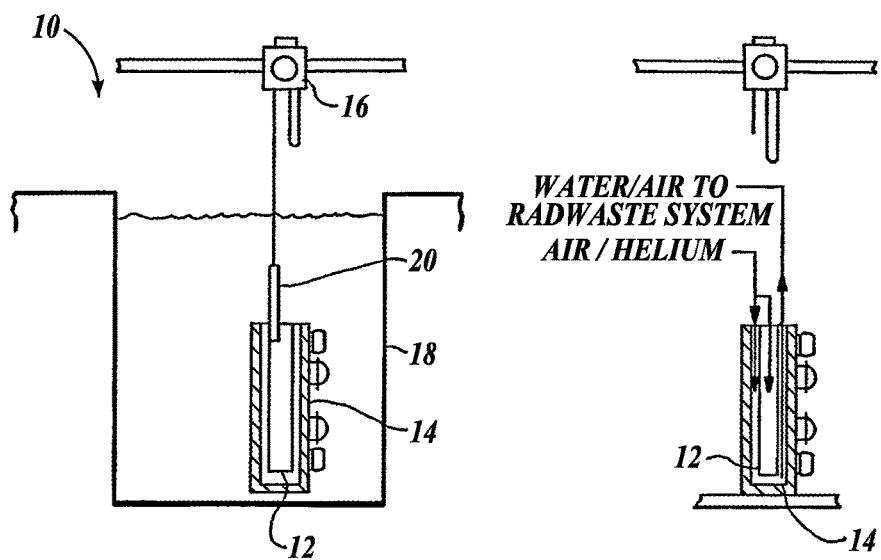
Fig.1 (PRIOR ART)
Fig.2 (PRIOR ART)
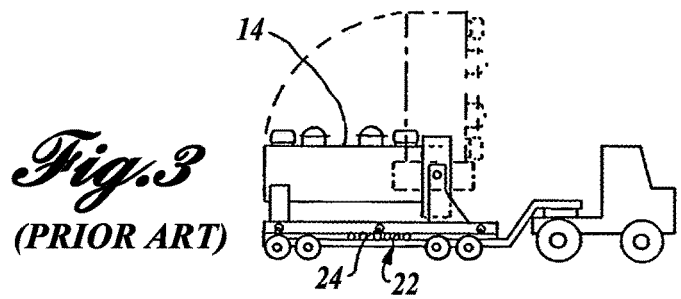
Fig.3 (PRIOR ART)
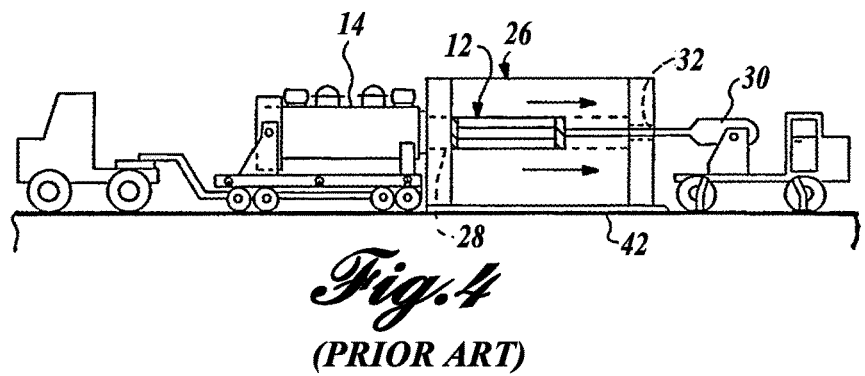
Fig.4 (PRIOR ART)

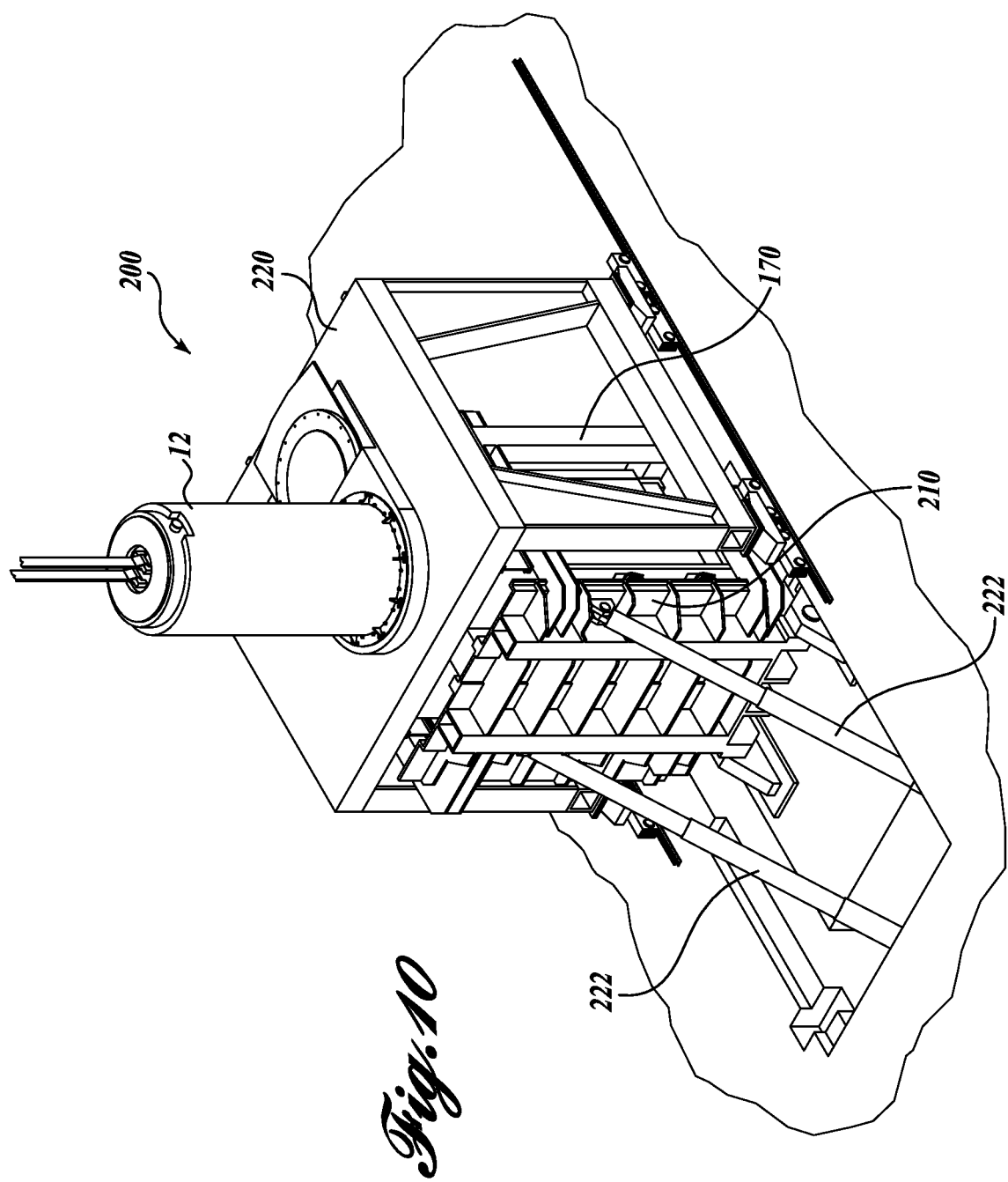

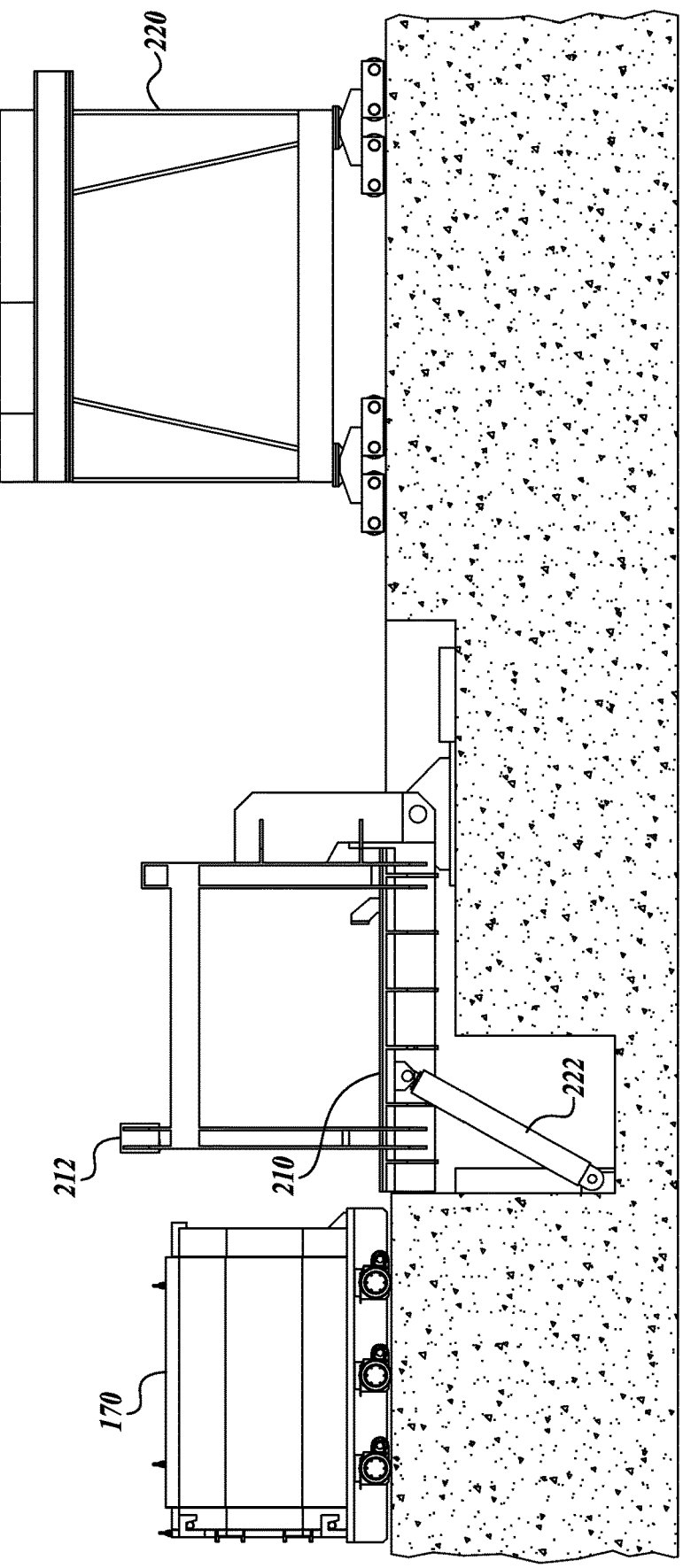

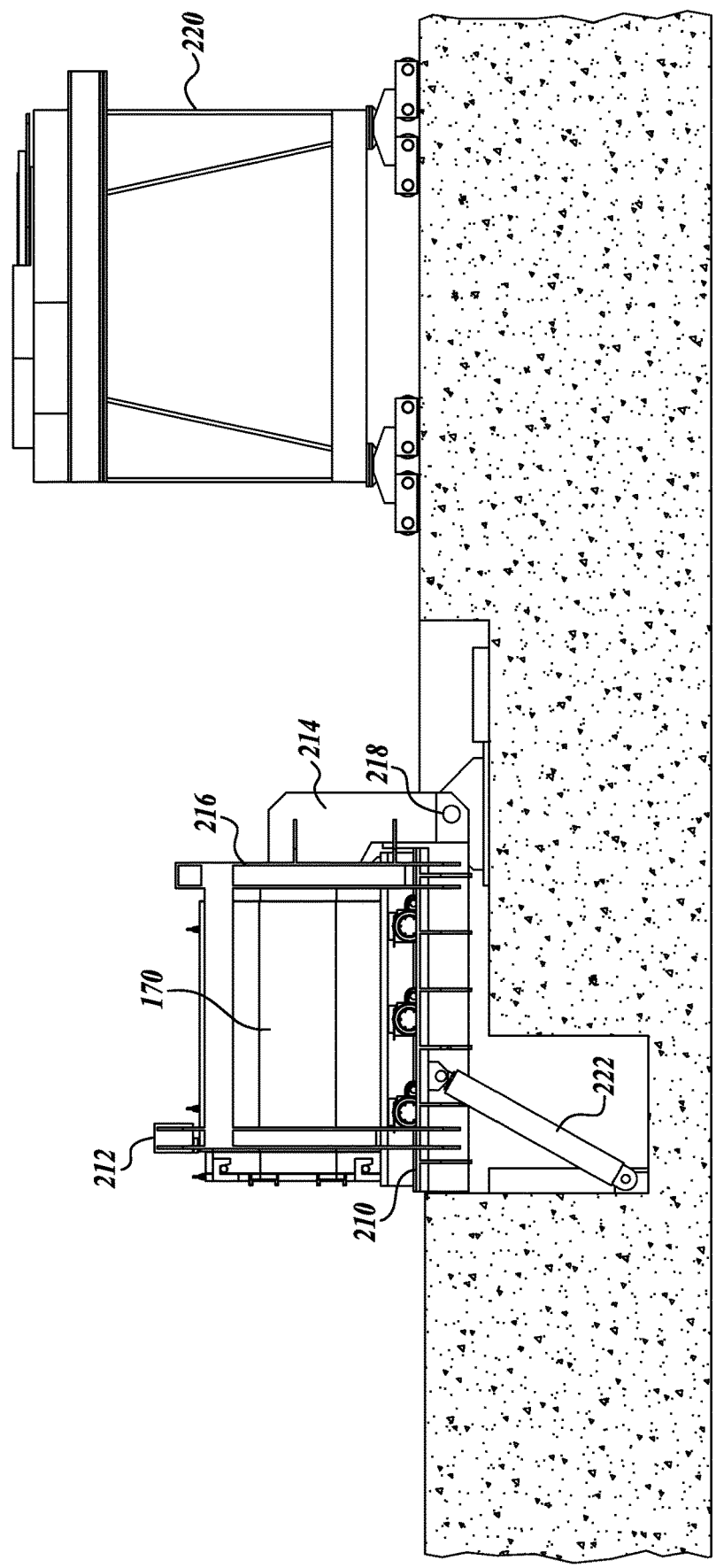

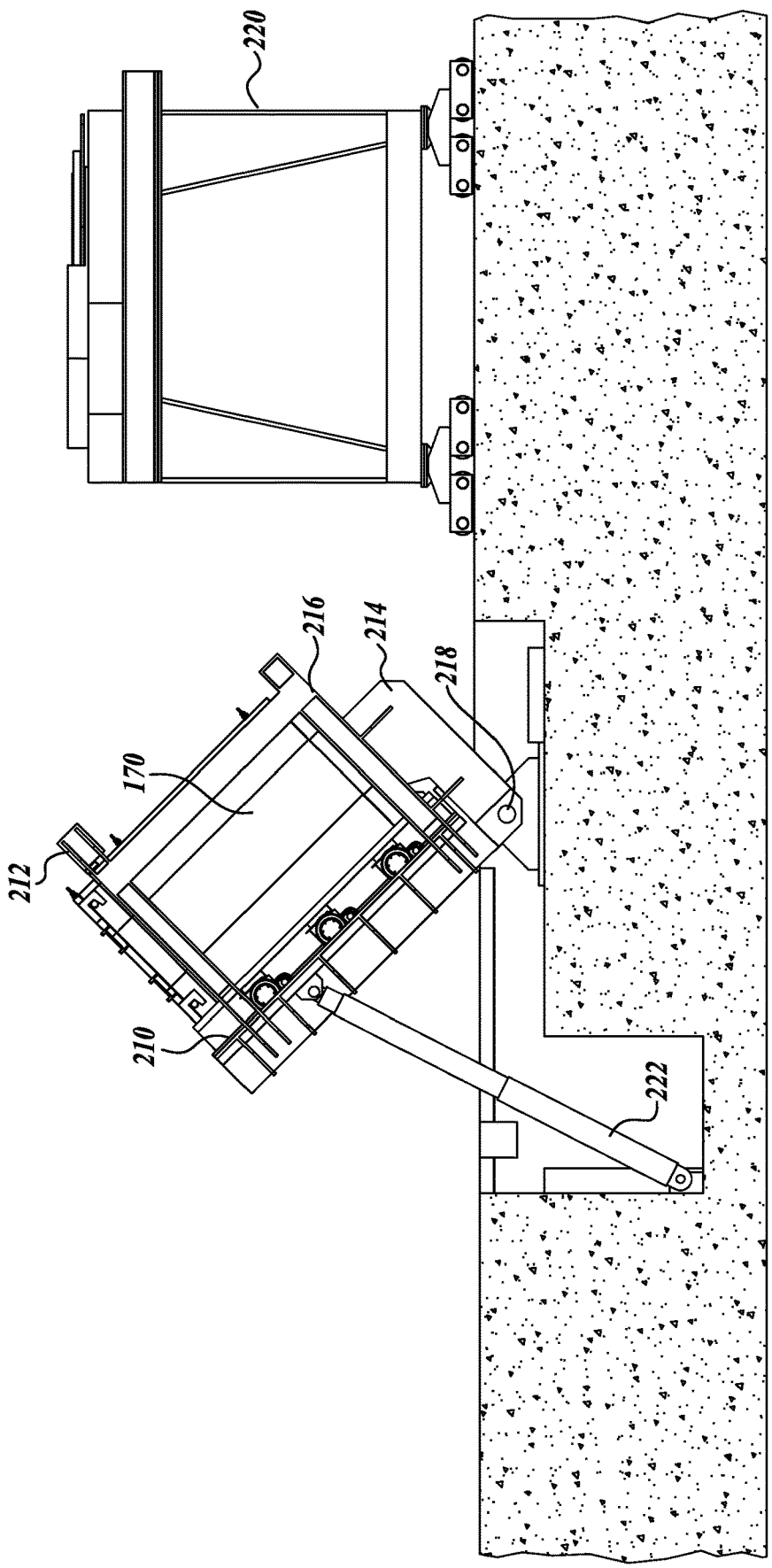

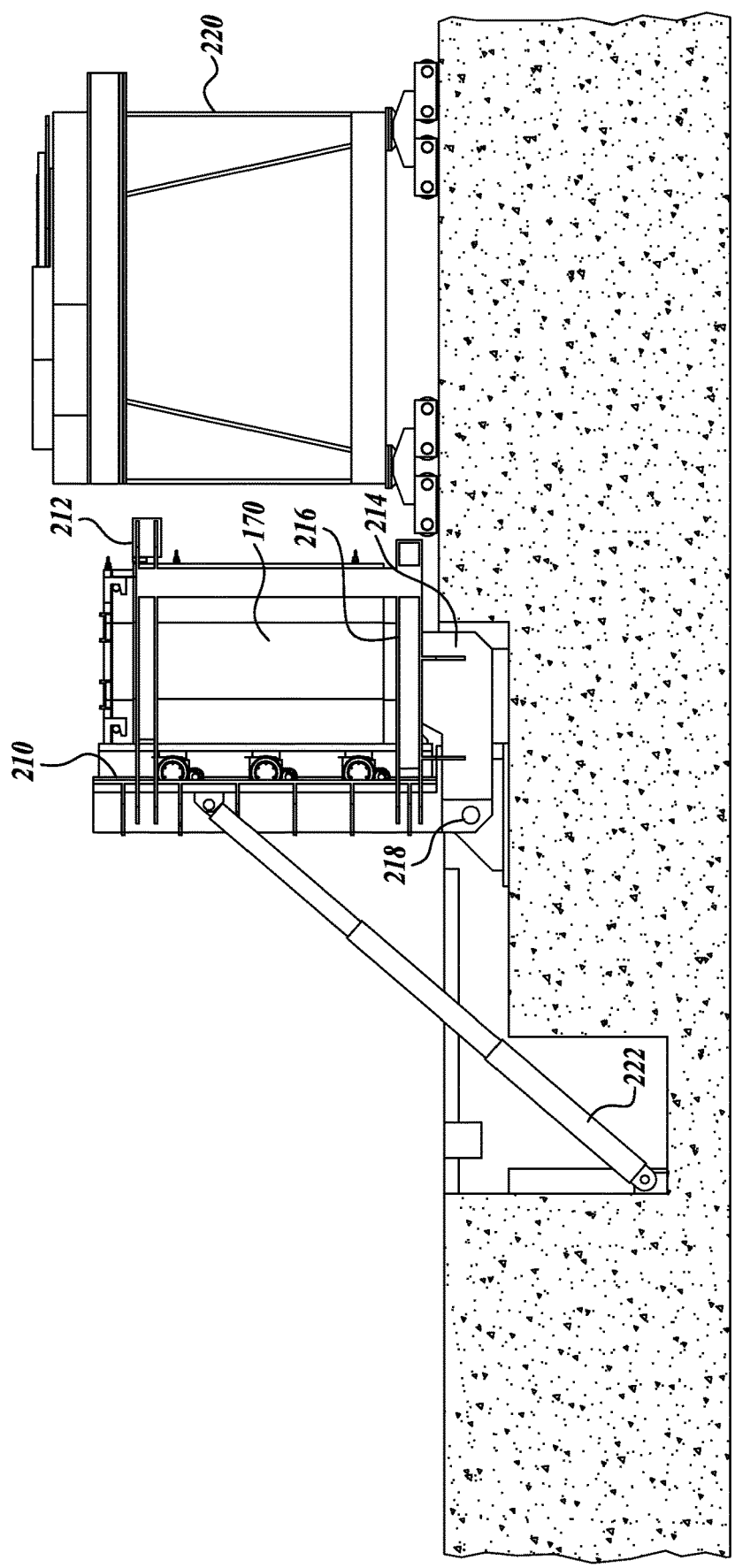

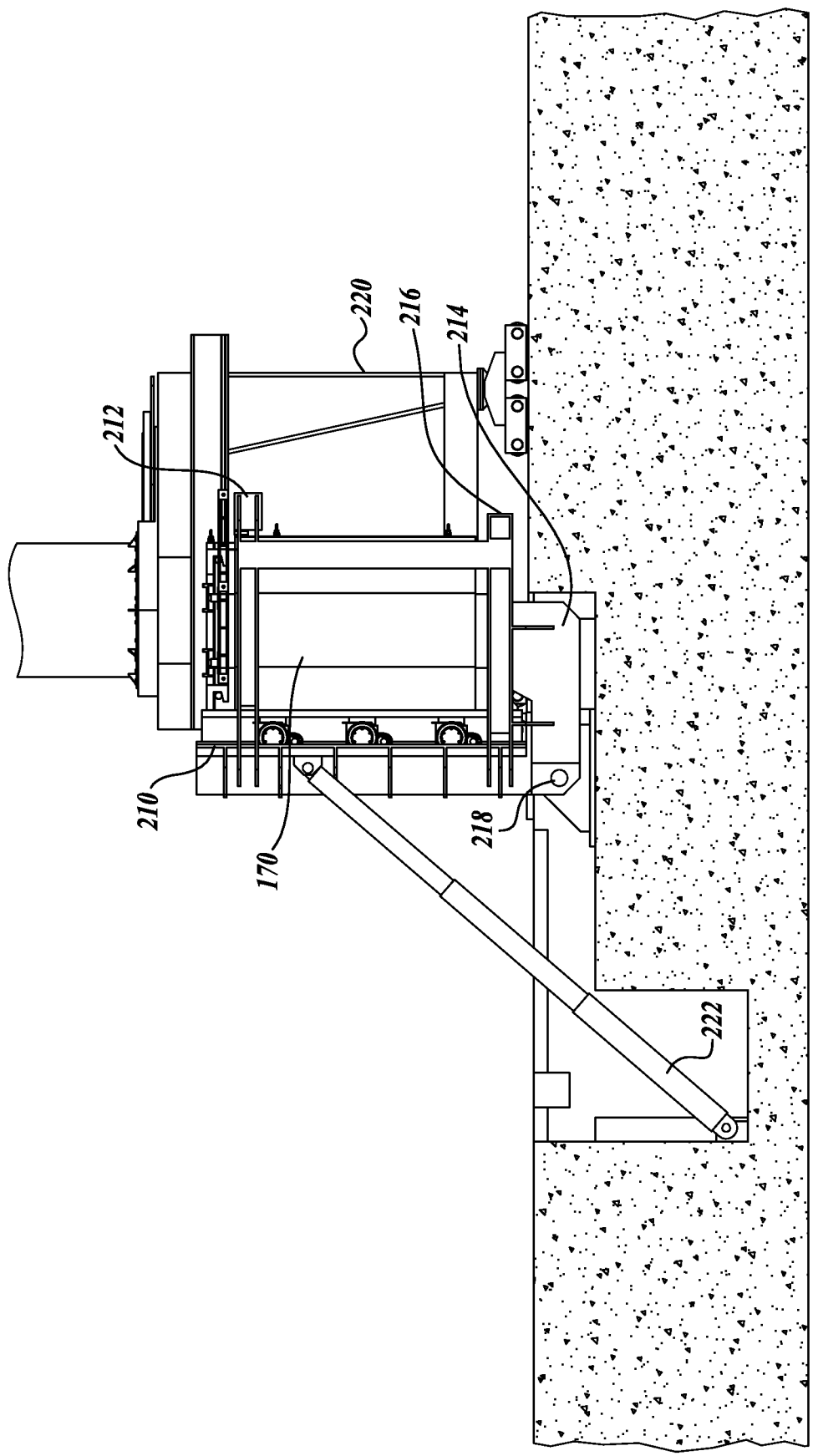

SPENT FUEL STORAGE SYSTEM, COMPONENTS, AND METHODS OF USE

CROSS-REFERENCE TO RELATED APPLICATION

This application claims the benefit of U.S. Provisional Application No. 62/039,361, filed Aug. 19, 2014, the disclosure of which is hereby expressly incorporated by reference in its entirety herein.

BACKGROUND

In a previously designed system and process described in U.S. Pat. No. 4,780,269 (as seen in FIGS. 1-4), a spent fuel storage system 10 uses a dry shielded canister 12. The canister assembly 12 is inserted into a transfer cask 14. The transfer cask 14 and canister assembly 12 can be placed by a crane 16 into an irradiated fuel storage pool 18 filled with water (see FIG. 1). Irradiated fuel contained in fuel assemblies (see, e.g., fuel assembly 20) can be stored in the pool 18.

To remove the irradiated fuel from the pool 18, the fuel is placed in the canister assembly 12, and appropriate seals and covers (as described below) are affixed to the canister assembly 12 before the transfer cask 14 is removed from the pool 18. Referring to FIG. 2, upon removal from the pool 18, water can be forced out of both the canister assembly 12 and the transfer cask 14 with a pressurized gas being applied through selected ports of the canister assembly and cask. The canister assembly 12 can further be dried by using a vacuum pump to evacuate the residual water from the canister assembly 12. After evacuation of the canister assembly 12, helium or another gas may be pumped into the canister assembly 12. As the transfer cask 14 (containing the canister assembly 12 and irradiation fuel assemblies 20) is removed from the pool 18, appropriate radiation shielding is provided for the contained irradiated fuel assemblies by the shielded end plugs of the canister assembly 12 and the transfer cask 14.

Referring now to FIG. 3, the transfer cask 14 can be loaded into a horizontal position onto a transfer trailer 22 having a specially designed skid 24. The skid 24 allows the transfer cask 14 to be moved in three dimensions to permit alignment of the cask 14 with a horizontal storage module (HSM) 26, which can be seen in FIG. 4, for dry storage of the canister assembly 12.

Referring to FIG. 4, the cask 14 is aligned with a port 28 in the HSM 26 to extract the canister assembly 12 from the transfer cask 14 for storage in the horizontal storage module 26. In the illustrated embodiment, a hydraulic ram 30 is at least partially insertable through a second port 32 at the opposite end of the dry storage module 26 to extract the canister assembly 12 from the transfer cask 14 for storage in the horizontal storage module 26. Alternatively, a winch (not shown) or another extraction device could be used in place of ram 30 to extract the canister assembly 12 from the transfer cask 14. It should further be appreciated that the reverse operation of pushing the canister assembly 12 into the dry storage module 26 can also be accomplished.

There exists a need for improvements to the previously designed storage system and method. Embodiments of the present disclosure aim to improve these and other systems and methods.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a transport conveyance for a canister containing radioactive material is provided. The conveyance includes means for lateral movement; walls defining an interior compartment for holding a canister and a support structure; and actuation means for moving the canister and the support structure horizontally from the compartment.

In accordance with another embodiment of the present disclosure, a transport conveyance for a canister containing radioactive material is provided. The conveyance includes one or more transport conveyance devices for lateral movement of the transport conveyance; outer walls defining an interior compartment for holding a canister and a support structure; and a transfer assembly for moving the canister and the support structure horizontally from the compartment.

In accordance with another embodiment of the present disclosure, a method of transferring radioactive material in a canister to a storage module is provided. The method includes acquiring radioactive material in a canister; placing the canister on a support structure in a transport conveyance; and moving the support structure and the canister into the storage module using a transfer assembly.

In accordance with another embodiment of the present disclosure, a method of transferring radioactive material in a canister to a storage module is provided. The method includes acquiring radioactive material in a canister; placing the canister on a support structure; and moving the support structure and the canister into the storage module.

In accordance with another embodiment of the present disclosure, a system for transferring a canister containing radioactive material from a cask to a horizontal storage module is provided. The system includes a transfer station for transferring the canister from the cask to a support structure; and a transport conveyance for conveying the canister and the support structure in a horizontal orientation to a horizontal storage module and loading the canister and the support structure into the horizontal storage module.

In accordance with another embodiment of the present disclosure, a horizontal storage module for a canister containing radioactive material is provided. The module includes a housing having an interior space for receiving a cylindrical canister disposed on a support structure; and a closure.

In accordance with another embodiment of the present disclosure, a transport conveyance for a canister containing radioactive material is provided. The conveyance includes means for lateral movement; walls defining an interior compartment for holding a canister and a support structure; and actuation means for moving the canister and the support structure horizontally from the compartment.

In accordance with another embodiment of the present disclosure, a transport conveyance for a canister containing radioactive material is provided. The conveyance includes one or more transport conveyance devices for lateral movement of the transport conveyance; outer walls defining an interior compartment for holding a canister and a support structure; and a transfer assembly for moving the canister and the support structure horizontally from the compartment.

In any of the embodiments described herein, the transport conveyance may be a transfer wagon.

In any of the embodiments described herein, the one or more transport conveyance devices may be selected from the group consisting of wheels, tracks, rollers, bearing pads, bearing surfaces, air skids, and combinations thereof.

In any of the embodiments described herein, the outer walls may include shielding material for radiation containment.

In any of the embodiments described herein, the transfer assembly may include a jack assembly.

In any of the embodiments described herein, the transfer assembly may include one or more transfer conveyance devices.

In any of the embodiments described herein, the transfer assembly may include a lateral extender.

In any of the embodiments described herein, the one or more transfer conveyance devices may be selected from the group consisting of wheels, tracks, rollers, bearing pads, bearing surfaces, air skids, and combinations thereof.

In any of the embodiments described herein, the transfer assembly may be hydraulically or electromechanically operated In any of the embodiments described herein, the canister may be placed on the support structure in a conveyance.

In any of the embodiments described herein, the conveyance may move the support structure and the canister to the storage module.

In any of the embodiments described herein, the storage module may be a horizontal storage module.

In any of the embodiments described herein, the support structure may be supported by a transfer wagon configured to move the canister.

In any of the embodiments described herein, the transfer wagon may include one or more outer walls.

In any of the embodiments described herein, the one or more outer walls may include shielding material for radiation containment.

In any of the embodiments described herein, the canister may be acquired in a horizontal orientation.

In any of the embodiments described herein, the canister may be acquired in a vertical orientation, further comprising transferring the material from the vertical orientation to a horizontal orientation before moving the support structure and the canister into the horizontal storage module.

In any of the embodiments described herein, transferring the material from the vertical orientation to the horizontal orientation may include up-ending the conveyance to a vertical orientation to receive the canister, then righting the conveyance to a horizontal orientation.

In any of the embodiments described herein, a method may include further comprising transferring the canister from a cask.

In any of the embodiments described herein, the transfer station may be a vertical to horizontal transfer station.

In any of the embodiments described herein, the transfer station may include an up-ender platform to move the transport conveyance to a vertical orientation for receiving the canister.

In any of the embodiments described herein, the transfer station may include a securement device for securing the transport conveyance on the up-ender platform.

In any of the embodiments described herein, the transfer station may include a gantry platform for mating with the transport conveyance when in the vertical orientation.

In any of the embodiments described herein, the gantry platform may guide a canister into the conveyance in the vertical orientation.

In any of the embodiments described herein, the gantry platform may include an aperture through which the canister is delivered.

In any of the embodiments described herein, the gantry platform may include a device for removing a lid on the cask to allow delivery of the canister from the cask.

In any of the embodiments described herein, the gantry platform may include a device for removing a door on the transport conveyance to allow insertion of the canister in the transport conveyance.

In any of the embodiments described herein, the up-ender platform may be configured to move the transport conveyance from a vertical orientation back to a horizontal orientation.

In any of the embodiments described herein, the transfer station may be a horizontal to horizontal transfer station.

In any of the embodiments described herein, the transfer station may include a roller stand.

In any of the embodiments described herein, the transfer station may include a lift assembly.

In any of the embodiments described herein, the lift assembly may be a sling lift assembly.

In any of the embodiments described herein, the conveyance may include an actuation assembly for moving the canister and the support structure into the horizontal storage module.

In any of the embodiments described herein, the transport conveyance may include one or more transport conveyance devices.

In any of the embodiments described herein, the one or more transport conveyance devices may be selected from the group consisting of wheels, tracks, rollers, bearing pads, bearing surfaces, air skids, and combinations thereof.

In any of the embodiments described herein, the transport conveyance may include a transfer assembly for loading the canister and the support structure into the horizontal storage module.

In any of the embodiments described herein, the transfer assembly may include a jack assembly, one or more transfer conveyance devices, and a lateral extender.

In any of the embodiments described herein, the one or more transfer conveyance devices may be selected from the group consisting of wheels, tracks, rollers, bearing pads, bearing surfaces, air skids, and combinations thereof.

In any of the embodiments described herein, the interior space of the HSM may have a rectangular cross-section.

In any of the embodiments described herein, the interior space of the HSM may not have a circular cross-section.

In any of the embodiments described herein, the housing may not include rails for receiving a canister.

In any of the embodiments described herein, the housing may not include heat shields.

In any of the embodiments described herein, the housing may not include dissipation fins.

In any of the embodiments described herein, the housing may be made from a high temperature concrete.

In any of the embodiments described herein, the housing may be made from a non-porous concrete.

In any of the embodiments described herein, a storage facility may include a plurality of adjacent horizontal storage modules as described herein.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIGS. 1-4 are schematics directed to a spent fuel storage system in a dry canister in accordance with a previously developed system and method;

FIG. 10-27 are various views of a vertical to horizontal (VTH) transfer station in accordance with one embodiment of the present disclosure.

DETAILED DESCRIPTION

Figure 5:
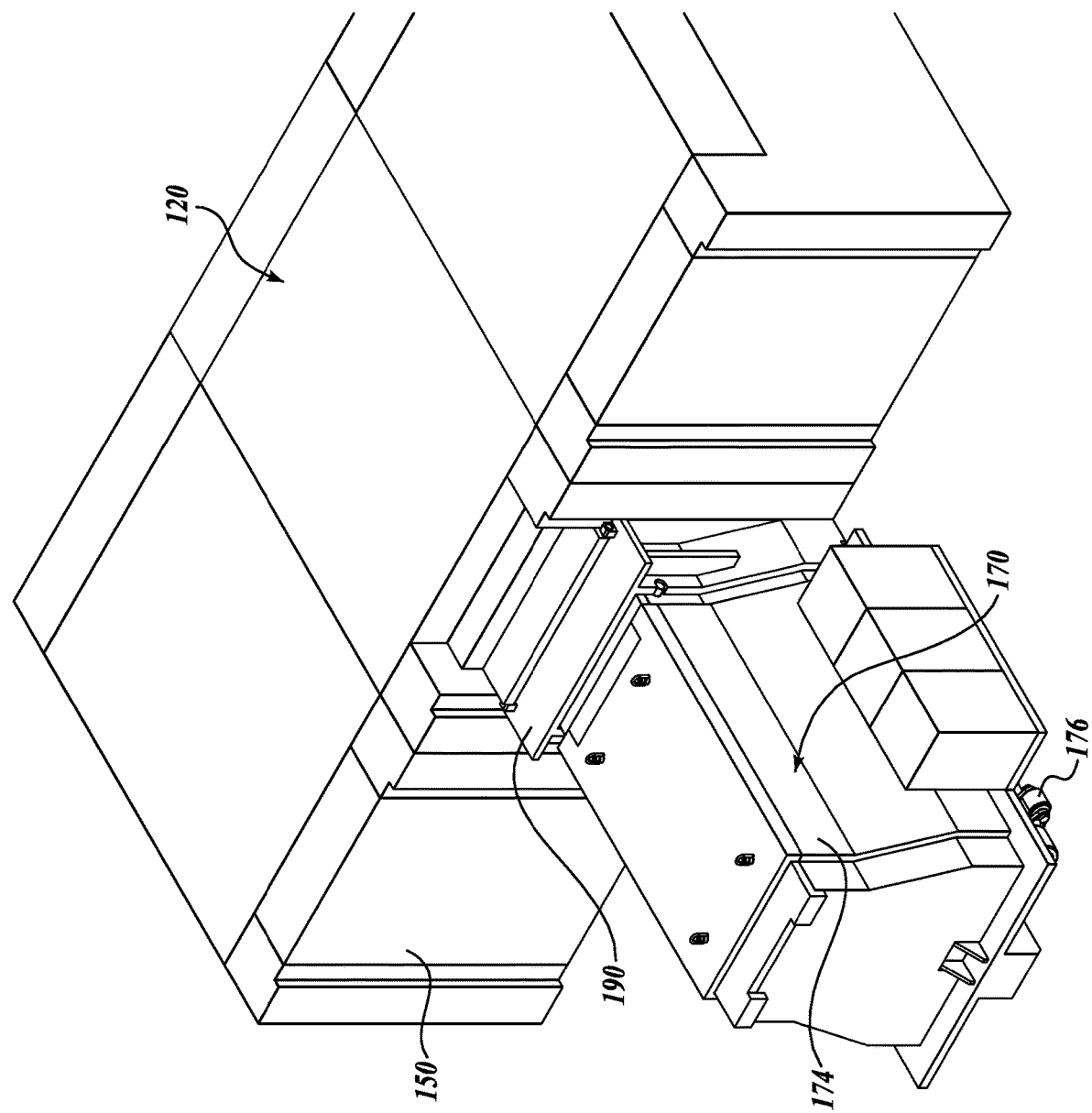
FIGS. 5-8 are various views of a horizontal storage module (HSM) system for long-term storage of a canister in accordance with one embodiment of the present disclosure.

The detailed description set forth below in connection with the appended drawings in which like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail so as not to unnecessarily obscure various aspects of the present disclosure. Further, it will be appreciated that embodiments of the present disclosure may employ any combination of features described herein.

Embodiments of the present disclosure are directed to systems, components, and methods for transferring canisters containing radioactive material, for example, from a container assembly using a transfer assembly to a horizontal storage module (HSM). Systems in accordance with various embodiments of the present disclosure include, for example, a vertical to horizontal (VTH) transfer station for a canister and method of transfer (see FIGS. 10-27), a horizontal to horizontal (HTH) transfer station for a canister and methods of transfer (see FIGS. 28-33), a transport wagon system for transporting a canister to a horizontal storage module (HSM) (see e.g., FIGS. 5, 25, and 28), and an HSM system for long-term storage of a canister (see FIG. 5-8).

Horizontal Storage Module (HSM)

With reference to FIG. 5-8, a horizontal storage modular (HSM) 120 for the dry storage of irradiated (e.g., spent) fuel will now be described. The horizontal dry storage module 120 includes a housing 140. The housing 140 is in block or rectilinear form and is preferably constructed from reinforced concrete, which may be positioned on a load-bearing foundation 142 (see, e.g., FIG. 6).

In previously designed HSMs, the housing was typically formed from concrete reinforced with rebar. However, in the improved design described herein, the housing 140 is reinforced with metal fiber, for example, steel fiber, to increase blast, missile, and earthquake resistance and provide long-term durability and crack resistance. The metal fiber also reduces shrinkage and cracking of the concrete in the short term, thereby decreasing water incursion and also increasing spalling resistance in the long term. In sum, the use of steel or other comparable fibers to reinforce the concrete increases the toughness, tensile strength, density, and dynamic strength of the concrete.

Vertical storage modules or other storage modules (not shown), having housings reinforced with metal fiber, for example, steel fiber, are also within the scope of the present disclosure. Also, it is to be appreciated that the use of metal fiber to reinforce the concrete can be used in lieu of or in addition to primary and secondary rebar used in standard concrete construction. Further, other high-strength fibers can be used in place of or in addition to metal fibers, such as fiberglass fibers, glass fibers, or carbon fibers.

In addition to metal fiber reinforcement, the housing 140 may be formed using a high temperature concrete, for example, CERATECH brand concrete. High temperature properties reduce the need for a heat dissipation assembly (such as a heat shield assembly) in the housing 140 by being more resistant to high temperatures and able to more readily dissipate heat.

In previously designed HSMs, heat shields are used in the interior space of the HSM by enhancing the overall heat rejection capability of canister assembly 12 by increasing the surface area for heat rejection. In that regard, the heat shields were designed to be heated both by radiation and by air flowing from the canister to the near surface of the shield by natural convection. A heat shield configuration directly increases the surface area available for transferring heat away from the canister 12. Also, a shielding surface facing the concrete wall increases the ability of the shield to serve as a heat barrier and protecting the concrete walls of the housing from being overheated.

Figure 8:
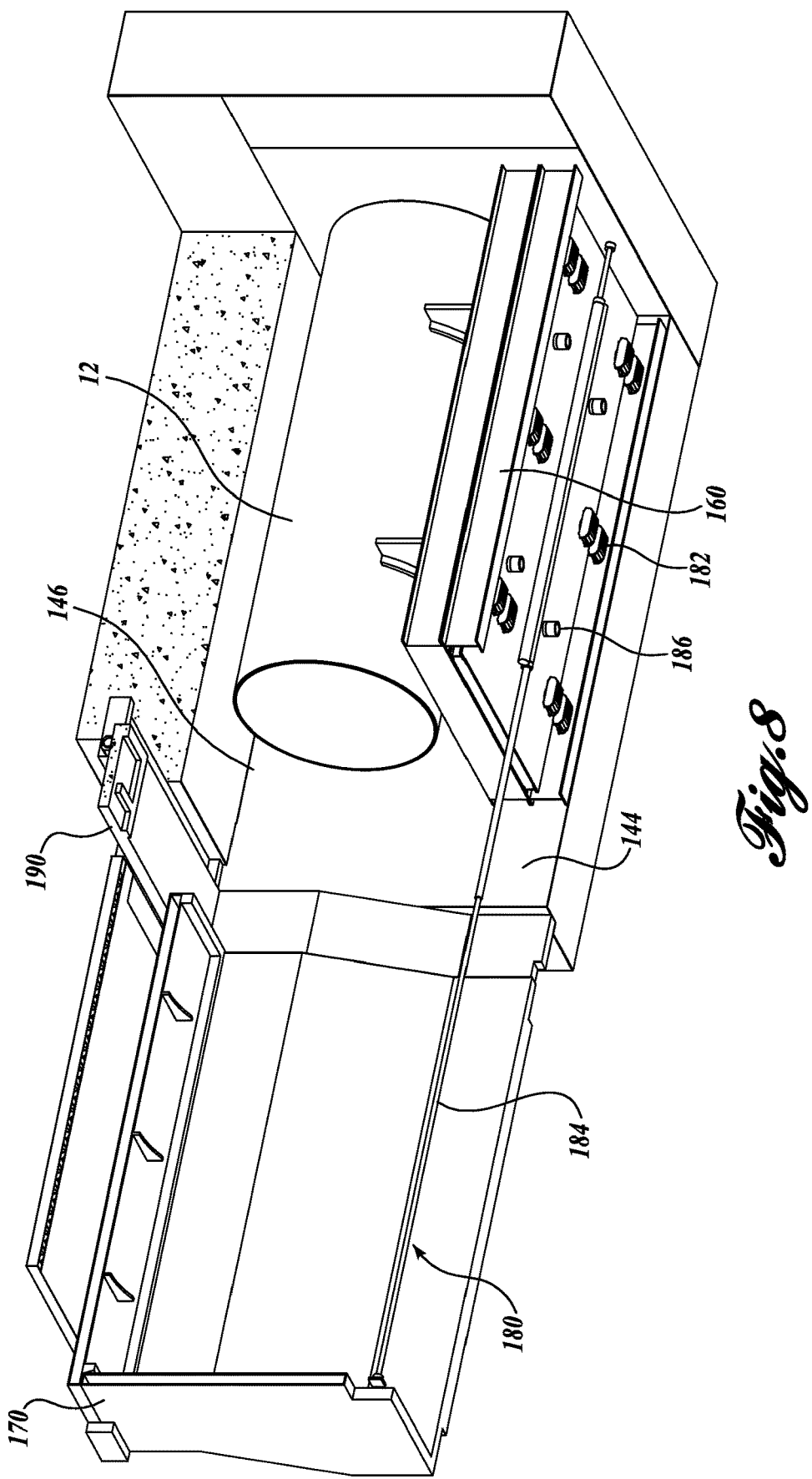

As a non-limiting example of a previous design, a heat dissipation assembly 60 including heat dissipation fins 62 from a previously designed HSM can be seen in FIG. 8. The fins 62 were used to enhance convective heat transfer from the canister surface to the air flowing through the module 26.

In addition to being high temperature, the concrete used in HSMs designed in accordance with embodiments of the present disclosure may be substantially non-porous. Non-porous properties improve the long-term durability of the housing 140 and help reduce or prevent water permeation.

The housing 140 includes an inlet 144 at one end and an interior volume 146 designed for receiving and containing a canister assembly 12. Embedded in housing 140 is an underlying support bed 148 to support the canister assembly 12 when it is fully inserted into housing 140. The support bed 148 may be positioned on an optional raised base-mat (not shown) to raise the height of the inlet 144 into the HSM 120, but to reduce the amount of concrete requirement for the housing 140.

In accordance with embodiments of the present disclosure, the canister 12 rests on a support structure or skid 160 transferred from a wagon 170 into the HSM together with the storage canister 12. In contrast, in previously designed systems, the canister 12 was moved along rails into the HSM (see FIG. 8).

One advantageous effect of the support structure 160 transferring into the HSM 120 is that it eliminates the need for highly accurate alignment that was required to slide the canister 12 onto the rails fixed in the previously designed HSM. In addition, the transfer of the support structure 160 reduces the chance of scratches to the canister 12, which may provide a weakness in the canister or opportunity for corrosion.

Figure 9:
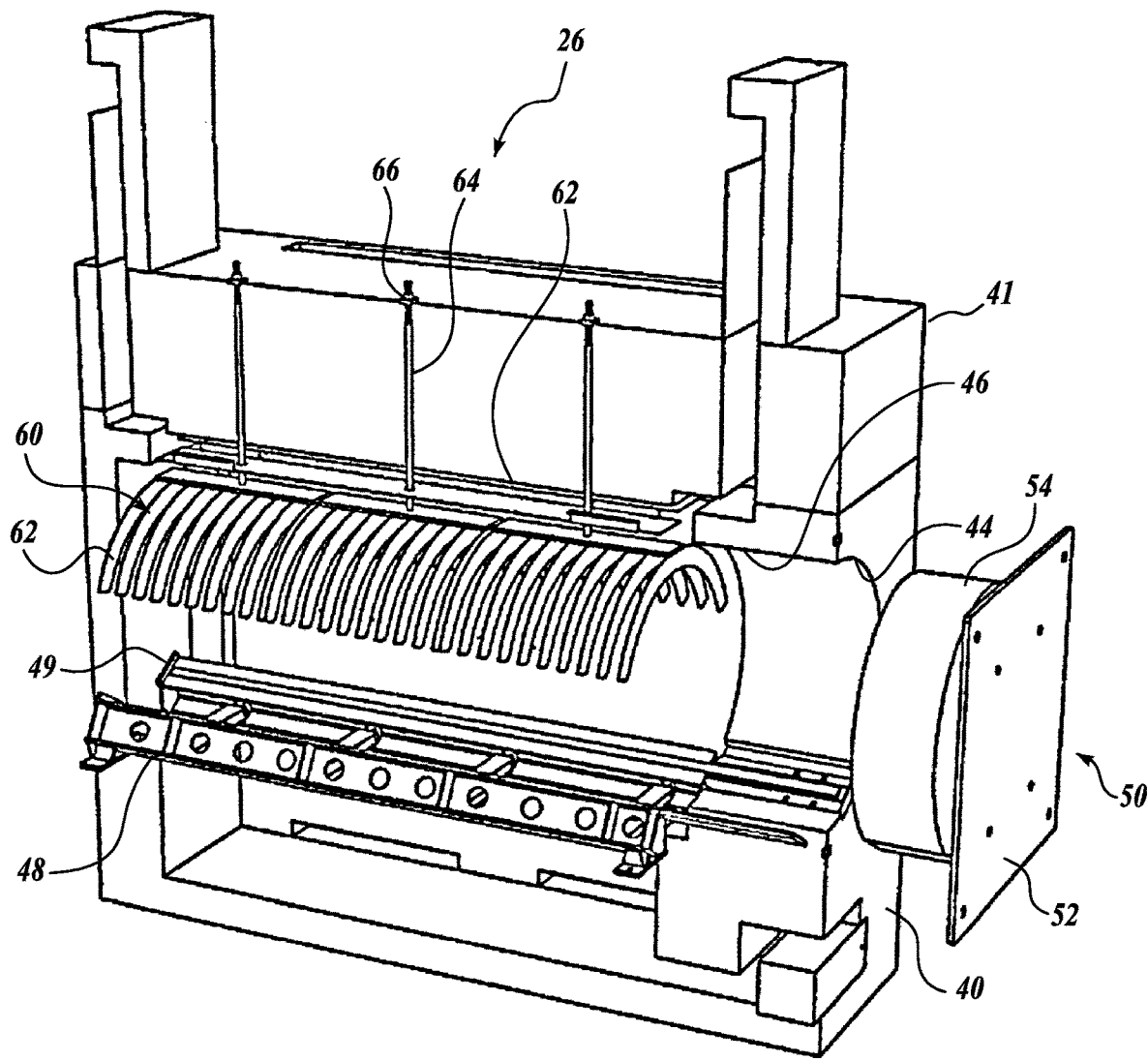
FIG. 9 is a cross-sectional isometric view of an HSM system for a canister in accordance with a previously developed system.

In addition, the cradle effect of the support structure 160 also contributes to improved convective air cooling of the canister 12 as compared to the previously designed longitudinal rail support as seen in FIG. 9. In that regard, the rectangular cross-section of the HSM has increased inner volume as compared to the circular cross-section of the previously designed HSM, allowing for more air circulation and heat dissipation.

As will be discussed in greater detail below, wagon 170 delivers the canister 12 on the support structure 160. Referring to FIG. 5, a temporary shielding structure 190 can be installed at the inlet 144 to the HSM 120. The support structure 160 and the wagon 170 include an actuation means, such as transfer assembly 180, for transferring the support structure 160 from the wagon 170 to the HSM 120 (see FIG. 6).

The housing 140 includes a closure device 150 to cover the inlet 144. The closure device 150 may be constructed from steel and/or concrete and/or other appropriate radiation protection media.

As seen in FIG. 9, a closure device 50 from a previously developed system includes an inner, round-shaped cover plug 54 and an outer hat plate 52 that is sized to overlap the front wall of the housing surrounding the inlet 44. The plug 54 closely fits within inlet 44.

In embodiments of the present disclosure, the closure device 150 is a wall-type structure that mates with the housing 140 (see FIG. 5), which provides for more structural integrity in the closure.

Referring to FIG. 5, the housing 140 may be designed and configured to allow similar housings 140 to be placed adjacent other housings, which may be interlocked therewith. Therefore, several housings 140 can be affixed next to each other and stacked together in series to provide additional shielding to minimize radiation leakage. Multiple HSMs 120 may be arranged in a centralized interim storage facility having infrastructure to support the dry storage of spent nuclear fuel.

As discussed in greater detail below, transfer systems are capable of placing into horizontal storage a canister 12 designed to be handled either horizontally or vertically. In addition, other configurations of placing a canister into vertical storage (not shown) from either horizontal or vertical transport are also within the scope of the present disclosure.

Transport Wagon

Figure 28:
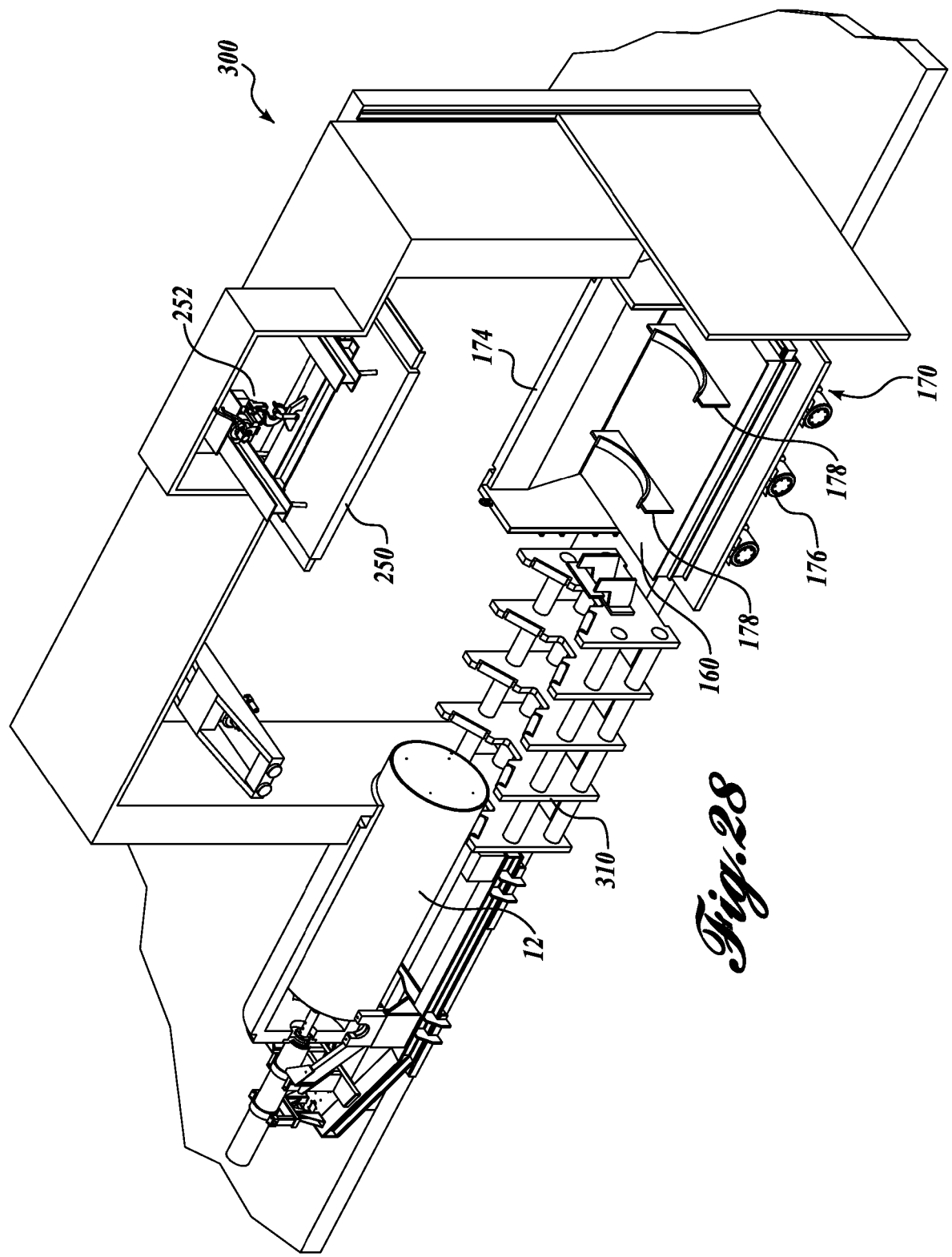
FIGS. 28-33 are various views of a horizontal to horizontal (HTH) transfer station in accordance with one embodiment of the present disclosure.

Referring to FIGS. 5 and 28, the transport conveyance or wagon 170 for transporting the canister 12 to the HSM 120 will now be described in detail. The wagon 170 is a configured to move and may include conveyance devices 176, including but not limited to wheels, tracks, rollers, bearing pads or surfaces, such as Teflon pads, air skids, or suitable other conveyance means or devices for movement, and combinations thereof. In addition, the wagon has outer walls 174 for receiving and containing a canister 12 supported on a support structure 160. The outer walls 174 may include shielding material for radiation containment.

The wagon 170 is sized and configured to support a support structure 160 for the canister 12. In the illustrated embodiment of FIG. 28, the support structure 160 is a pallet or skid upon which the canister 12 is received. In the illustrated embodiment, the support structure 160 includes two supports 178 for holding the canister 12.

Figure 6:
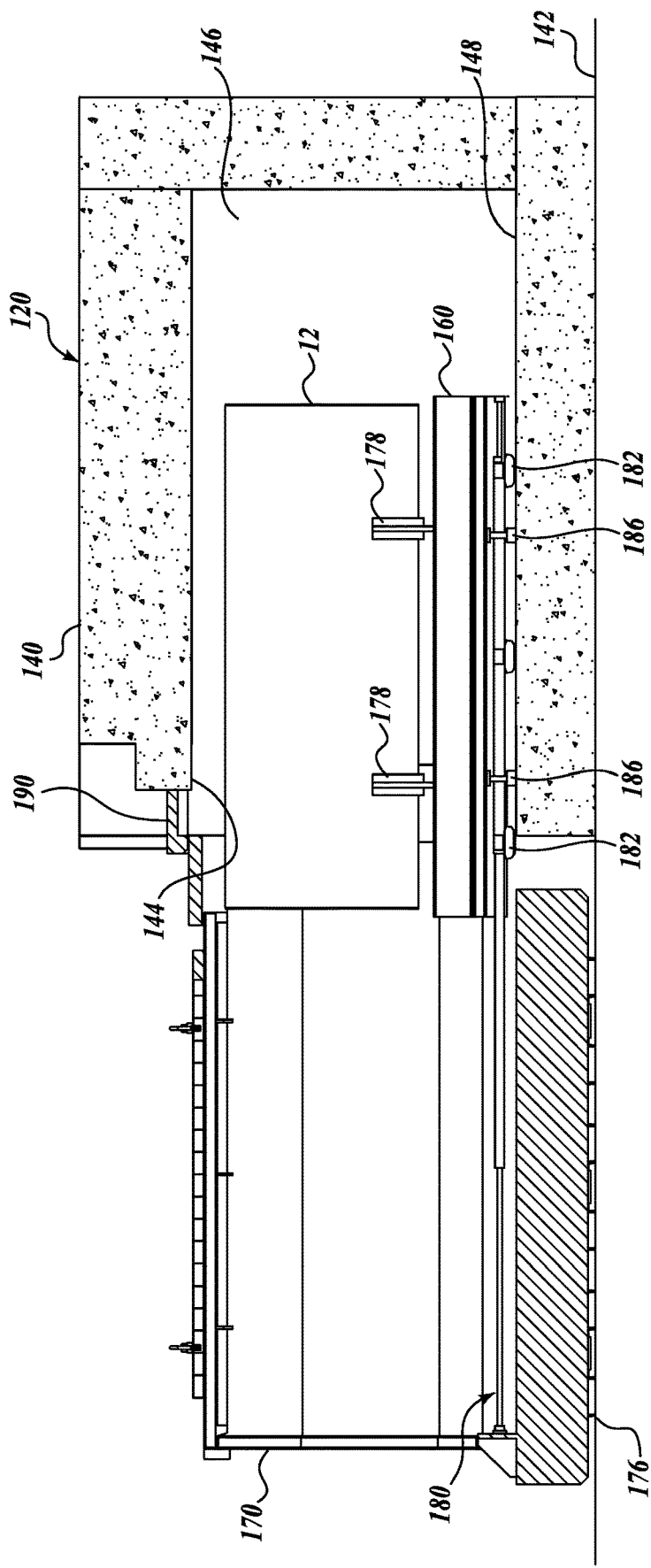
Figure 7:
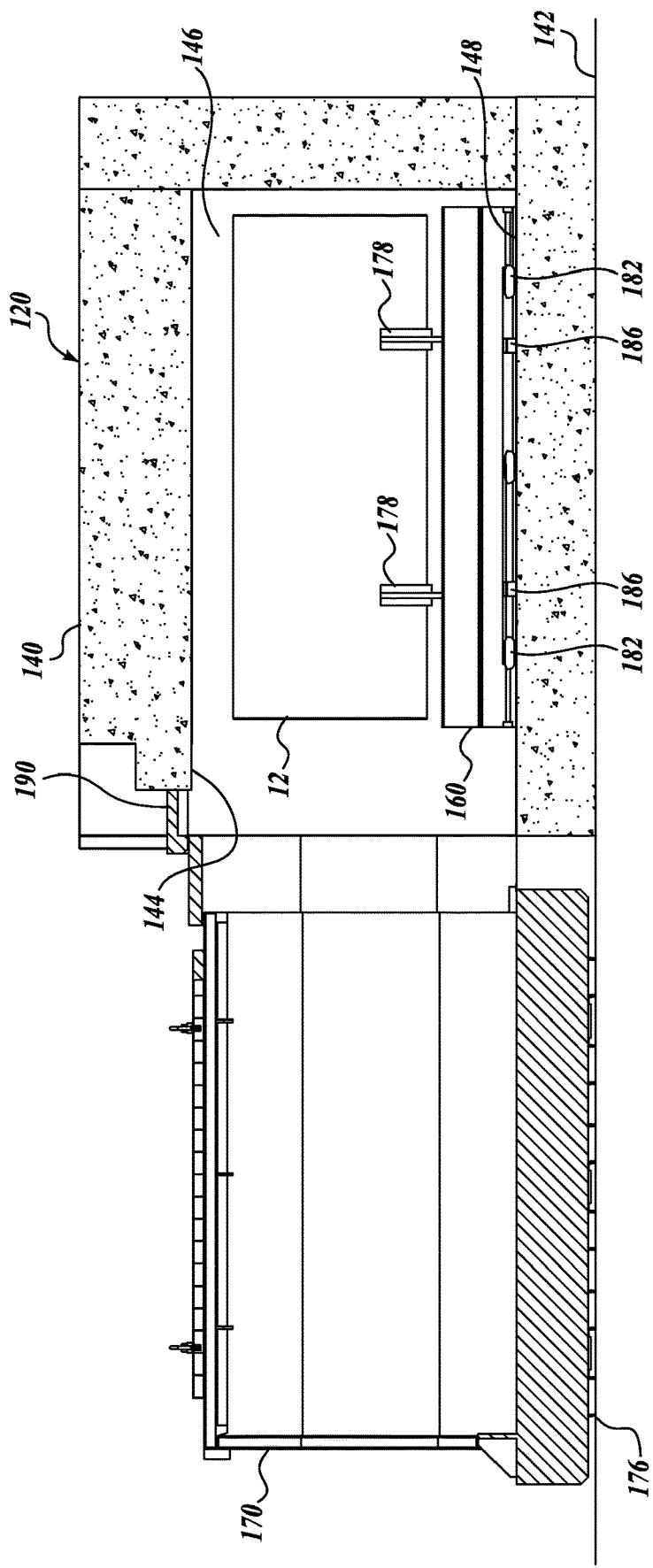

As can be seen in FIGS. 6 and 7, the canister 12 is transferred to the HSM 120 by transferring the entire support structure 160 upon which the canister 12 is supported from the wagon 170 and into the HSM 120.

In the illustrated embodiment of FIG. 8, transfer is achieved by a transfer assembly 180 that includes a jack assembly 186, rollers or tracks 182, and a lateral extender 184. The transfer assembly 180 is shown in FIG. 8 in a cut-away view of the undercarriage of the support structure 170. When in the transport wagon 170, the jacks that make up the jack assembly 180 are extended such that the support structure 160 is lifted off tracks 182 and therefore not capable of lateral movement. When the wagon 170 is aligned with the inlet of the HSM 120, the jack assembly 180 can be retracted, such that the support structure 160 rests on the transfer conveyance devices 182. In the illustrated embodiment, the transfer conveyance devices are show as rollers. Other transfer conveyance devices include but are not limited to wheels, tracks, rollers, bearing pads or surfaces, such as Teflon pads, air skids, or suitable other conveyance means or devices for movement, and combinations thereof. When enabled for lateral movement, a lateral extender 184 can telescope to push against a wall of the wagon 170 to push the support structure 160 and the canister 12 into the interior 146 of the HSM 120. The transfer assembly 180 may be hydraulically or electromechanically operated.

As described in greater detail below with respect to FIGS. 10-33, the transport wagon 170 is designed and configured for either vertical or horizontal receipt of a canister 12.

Vertical to Horizontal Transfer Station

Referring to FIG. 10-27, a vertical to horizontal (VTH) transfer station 200 and methods of using the same will now be described. Referring to FIG. 10, the VTH transfer station 200 includes up-ender platform 210 for receiving the transport wagon 170, and a gantry platform 220 to guide the insertion of a canister 12 into the up-ended transport wagon 170.

Now referring to FIGS. 11-15, a method of transferring a canister 12 into the transport wagon 170 using the VTH transfer station 200 will be described. Referring to FIG. 12, the transport wagon 170 rolls onto and is received on the up-ender platform 210 and abuts a stop 214 that prevents the transport wagon 170 from traveling off the up-ender platform 210. When on the platform 210, a frame 216 surrounds the wagon. A securement device 212 on the frame can be used to secure the wagon 170 on the platform 210.

Figure 17:
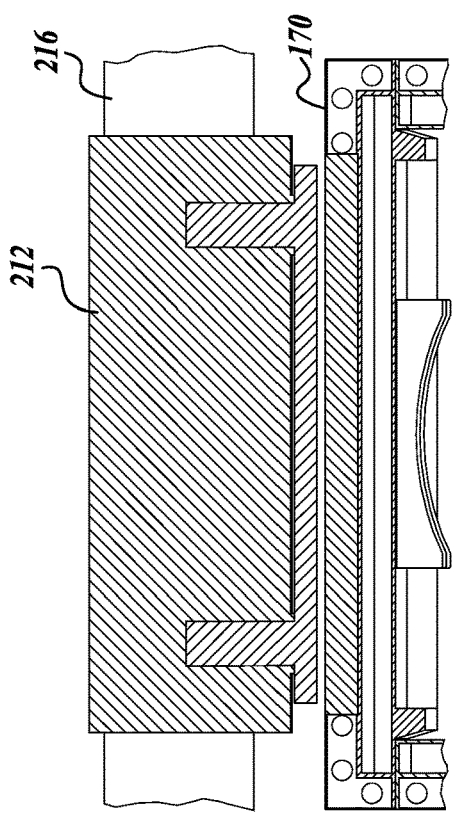
Figure 18:
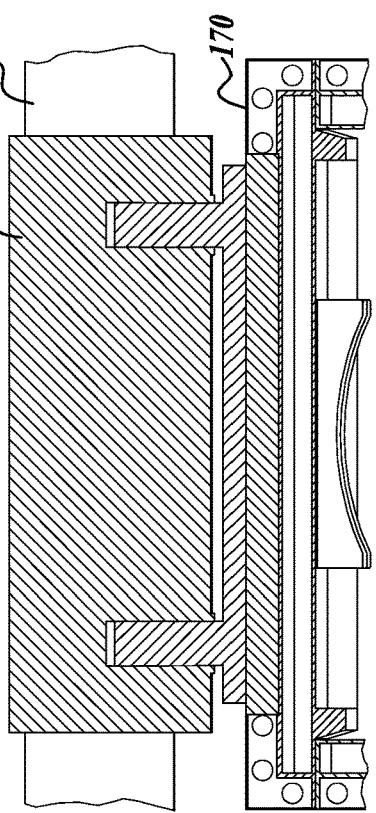
Figure 16:
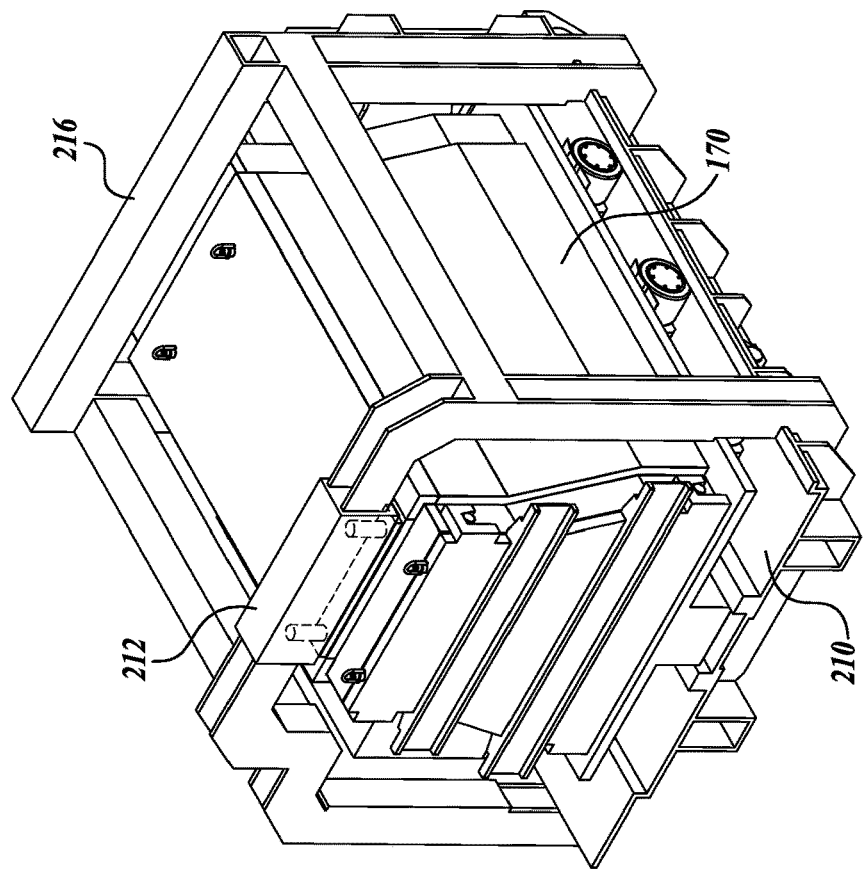

In the illustrated embodiment of FIGS. 16-18, the securement device 212 is a clamping mechanism that is spaced from the top of the transport wagon 170. When the wagon 170 is received on the up-ender platform 210, the clamping mechanism engages the top of the wagon 170 to secure the wagon on the platform 210.

Referring to FIGS. 12-14, the up-ender platform 210 is then tilted from its normal horizontal position (see FIG. 12) to an intermediate position (see FIG. 13), and to an upright vertical position (see FIG. 14). In the illustrated embodiment, a lifting device 222 located beneath one end of the platform 210 lifts the platform such that the platform pivots 90 degrees around pivot hinge 218. The lifting device 222 may be a hydraulic device or other type of lifting device.

Comparing FIGS. 14 and 15, after the wagon 170 is up-ended to the vertical position, a gantry platform 220 moves to align with the transport wagon 170 in an engaged position. When in the upright vertical position and engaged with the gantry platform 220, a vertically oriented canister 12 can be lowered into the up-ended wagon 170 (as further described below with reference to FIGS. 19-27).

Figure 19:
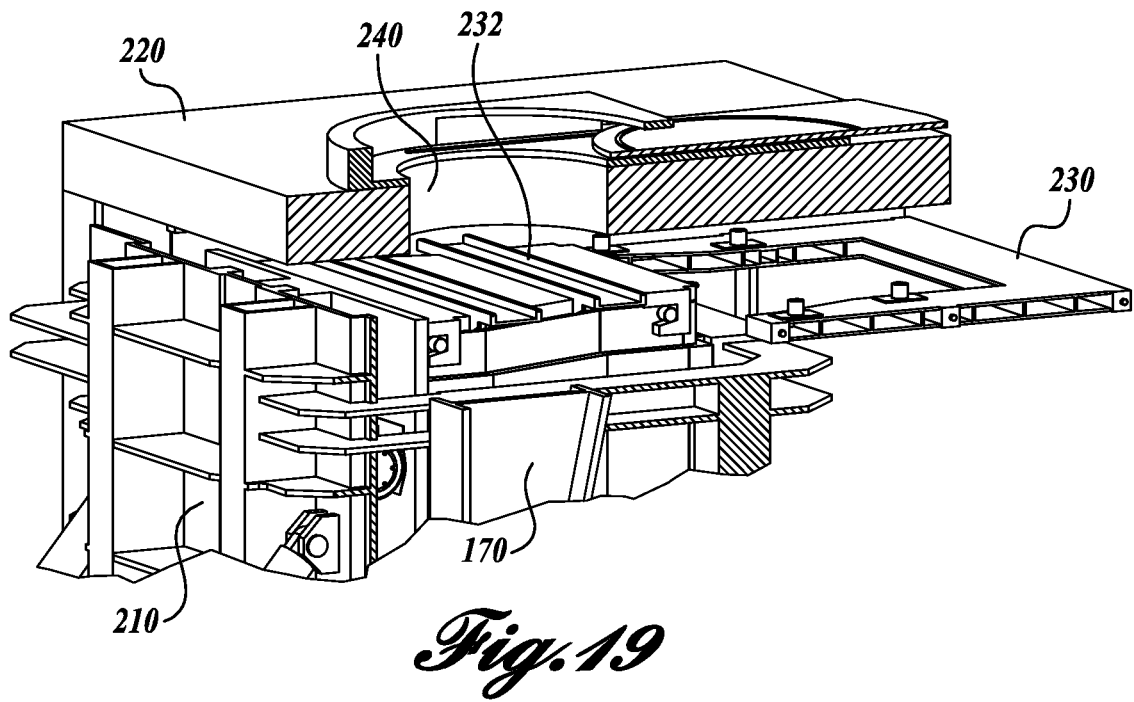
Figure 20:
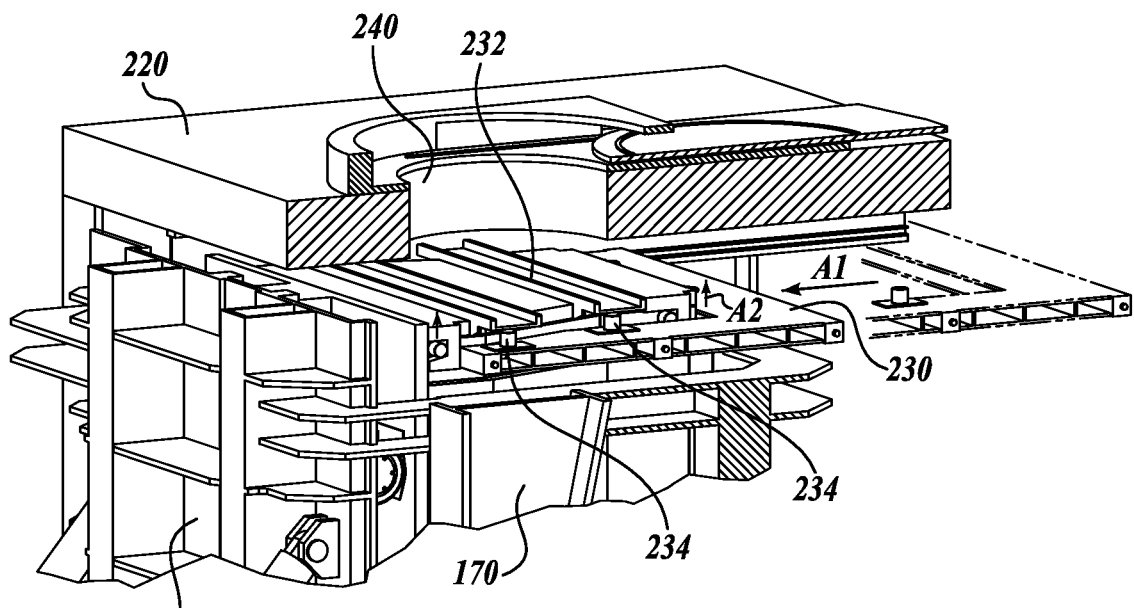
Figure 21:
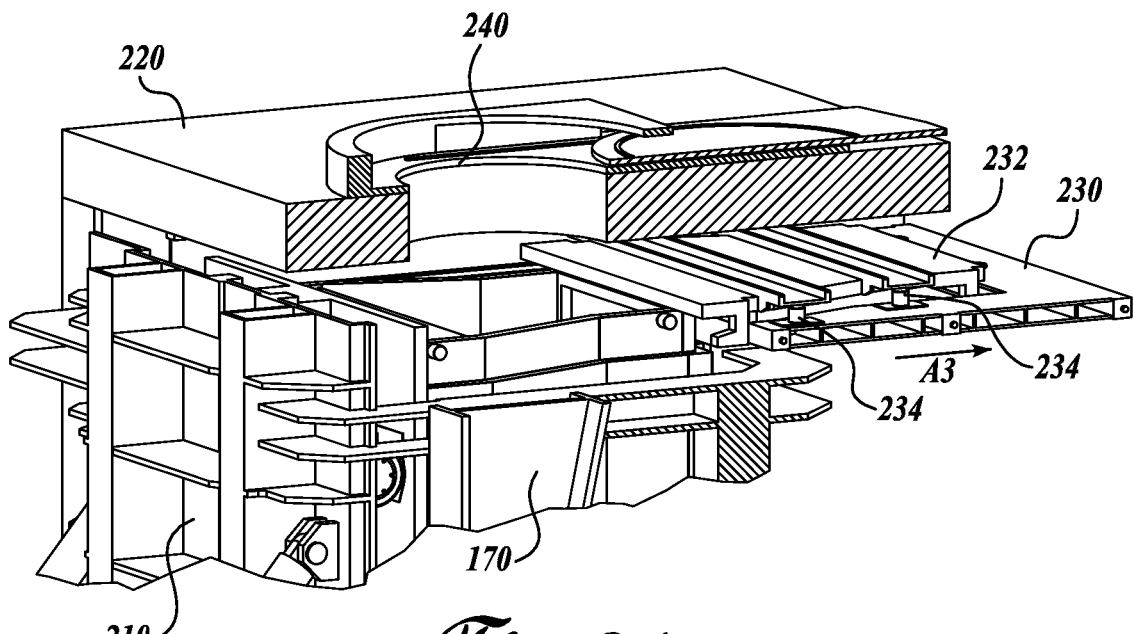

Referring now to FIGS. 19-21, the mechanism for opening the wagon door 232 to allow access for the canister is shown and described. When the gantry platform 220 is engaged with the up-ender platform 210, a sliding platform 230 on the gantry platform 220 can be used to slidingly open the wagon door 232. In that regard, the sliding platform 230 slides from a first unengaged position (see FIG. 19) to a second engaged position (see FIG. 20), in the direction of arrow A1 in FIG. 20.

When engaged, extensions 234 extend upwardly to engage with the door 232 in the direction of arrow A2 in FIG. 20. When the extensions 234 are engaged with the door 232, they are used to pull the door 232 in the direction of arrow A3 in FIG. 21 from a closed position (see FIG. 20) to an open position (see FIG. 21).

Figure 22:
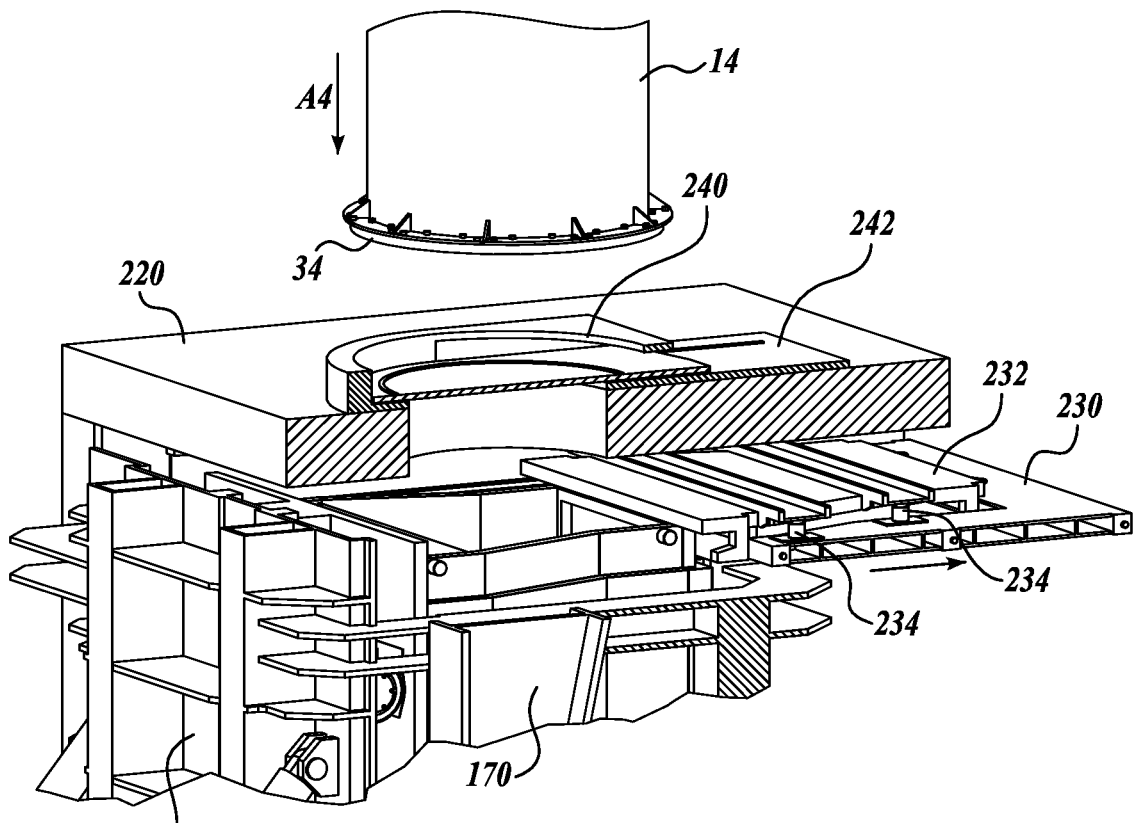

Referring now to FIG. 22, the vertically oriented transport cask 14 holding a canister 12 can be lowered to meet the gantry platform 220 in the direction of arrow A4 and be deposited into the up-ended wagon 170. In that regard, the gantry platform 220 includes a top aperture 240 for receiving a canister 12 therethrough.

Figure 23:
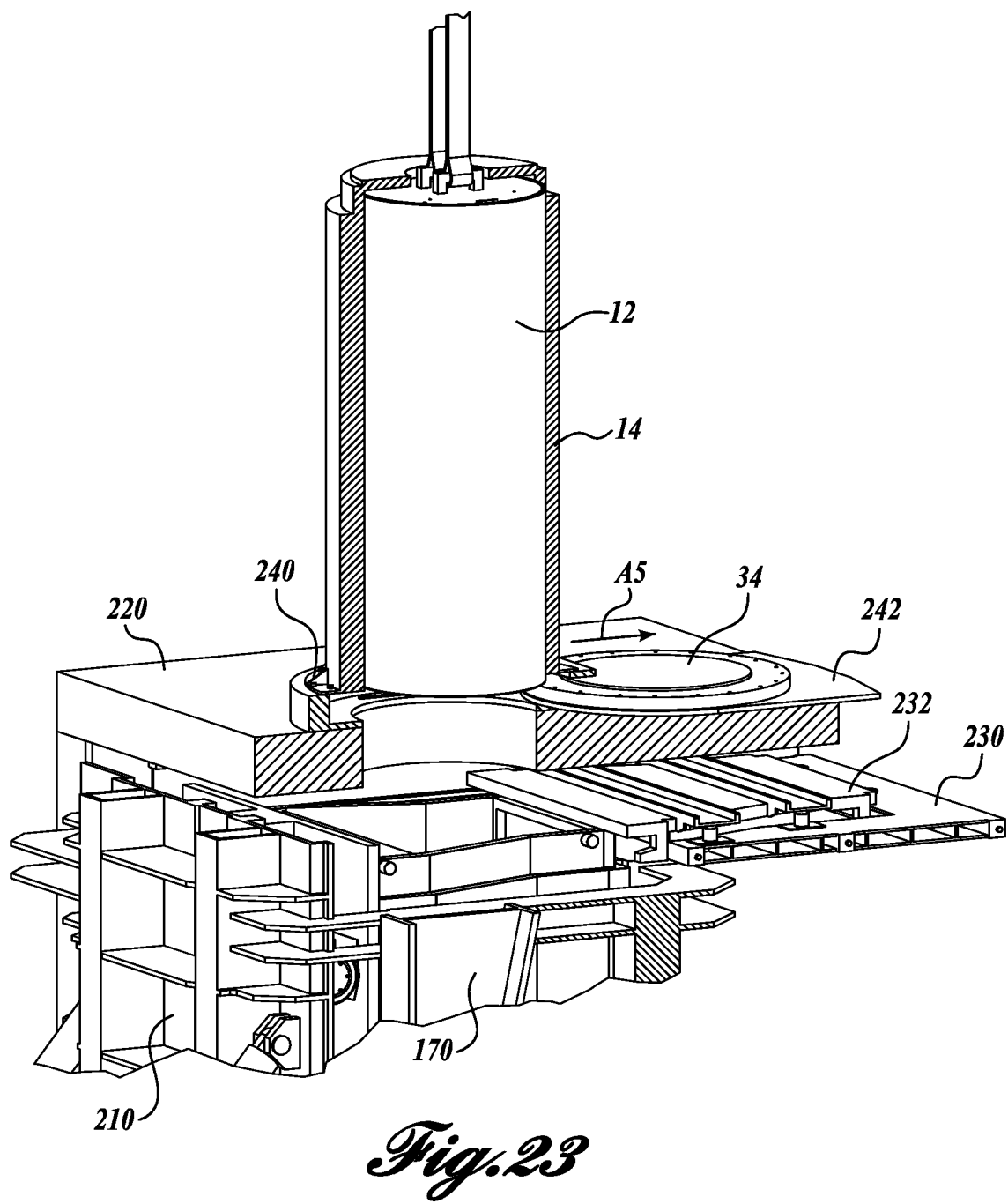
Figure 24:
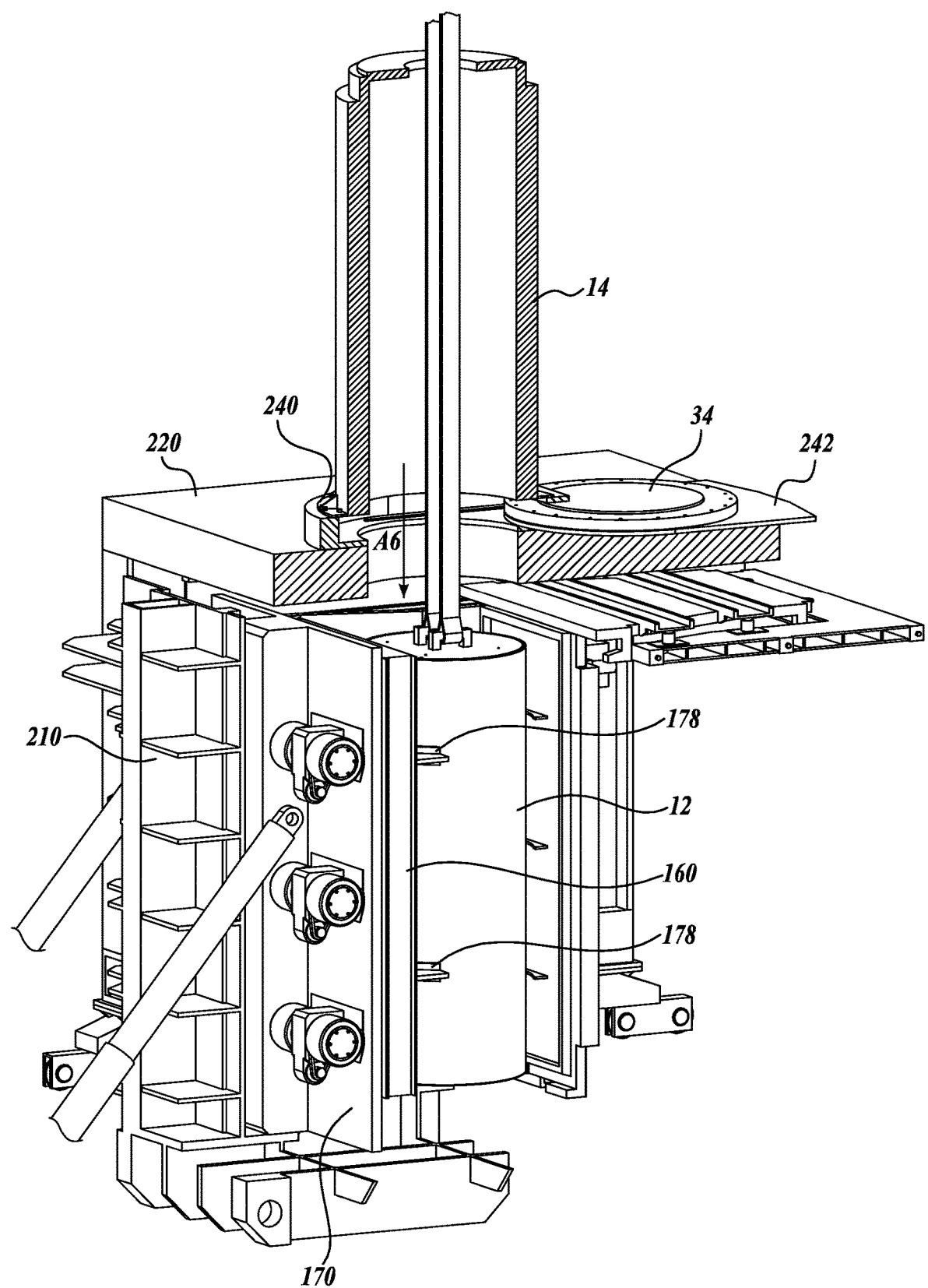
Figure 25:
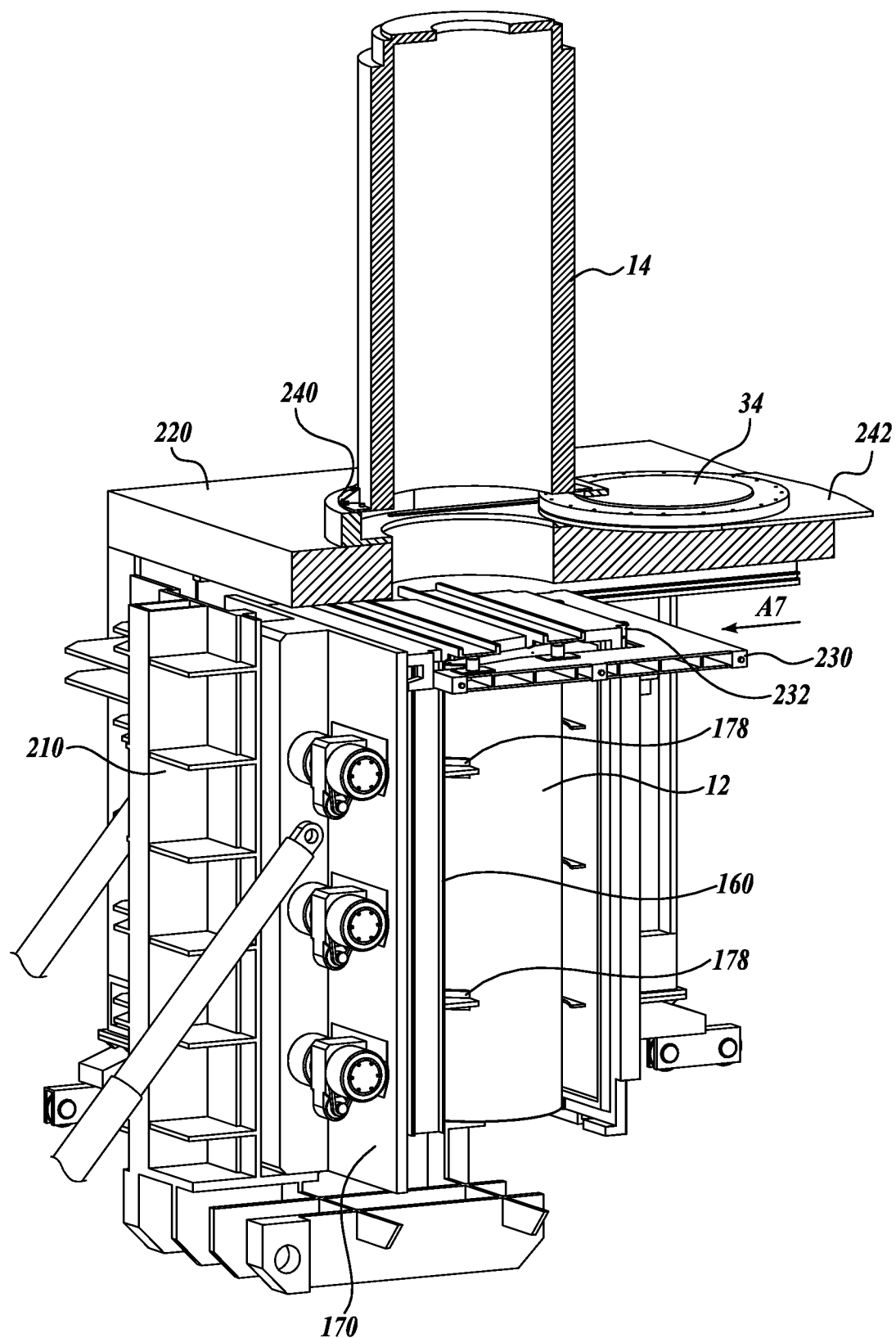
Figure 26:
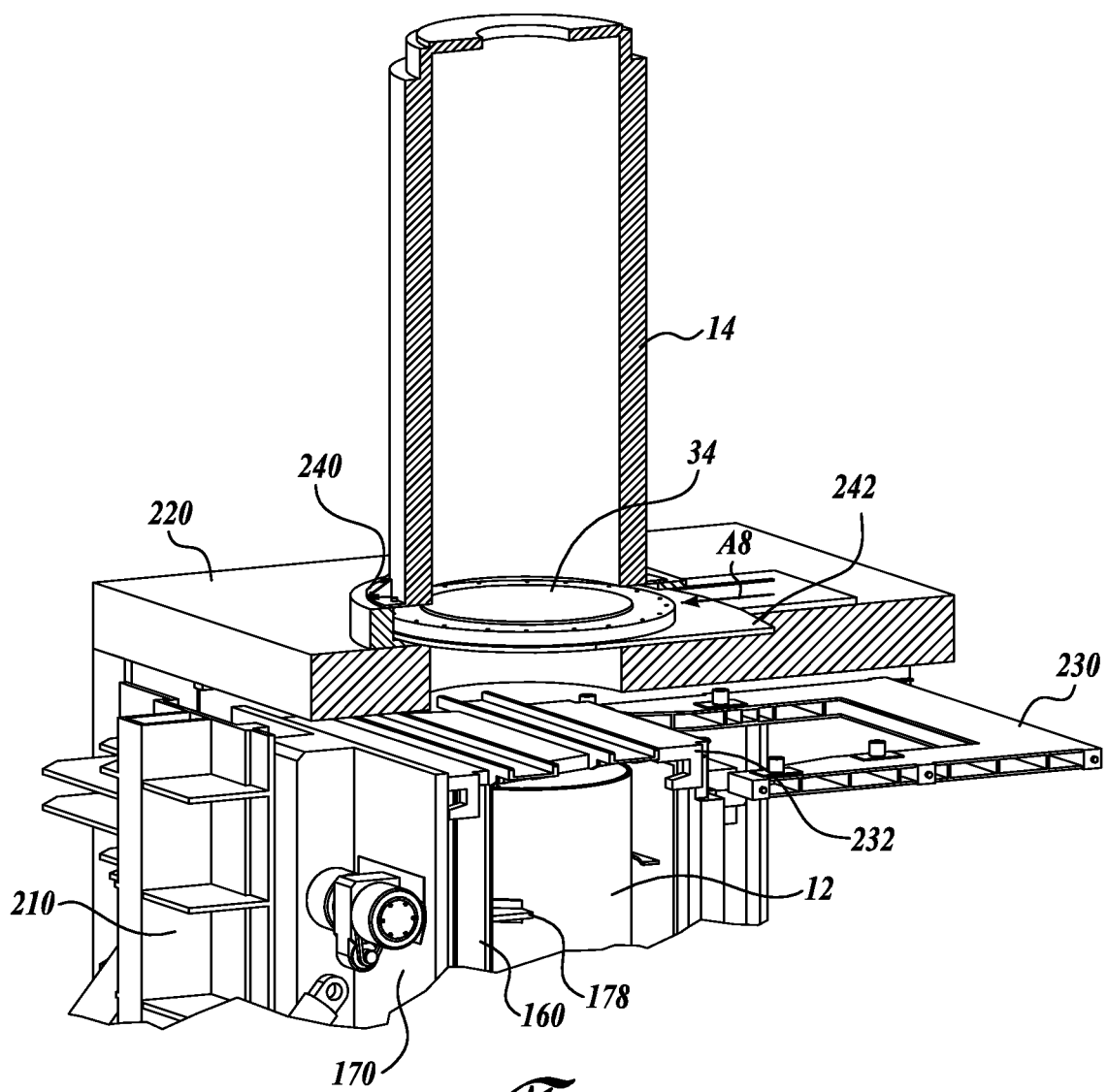

Referring now to FIG. 23, when the cask 14 abuts the gantry platform 220, a lid 34 on the cask 14 can be slidingly removed from the cask 14 using sliding platform 242 which is configured to move in the direction of arrow A5. As can be seen in FIG. 24, the canister 12 is lowered from the cask 14 into the wagon 170 in the direction of arrow A6.

Figure 27:
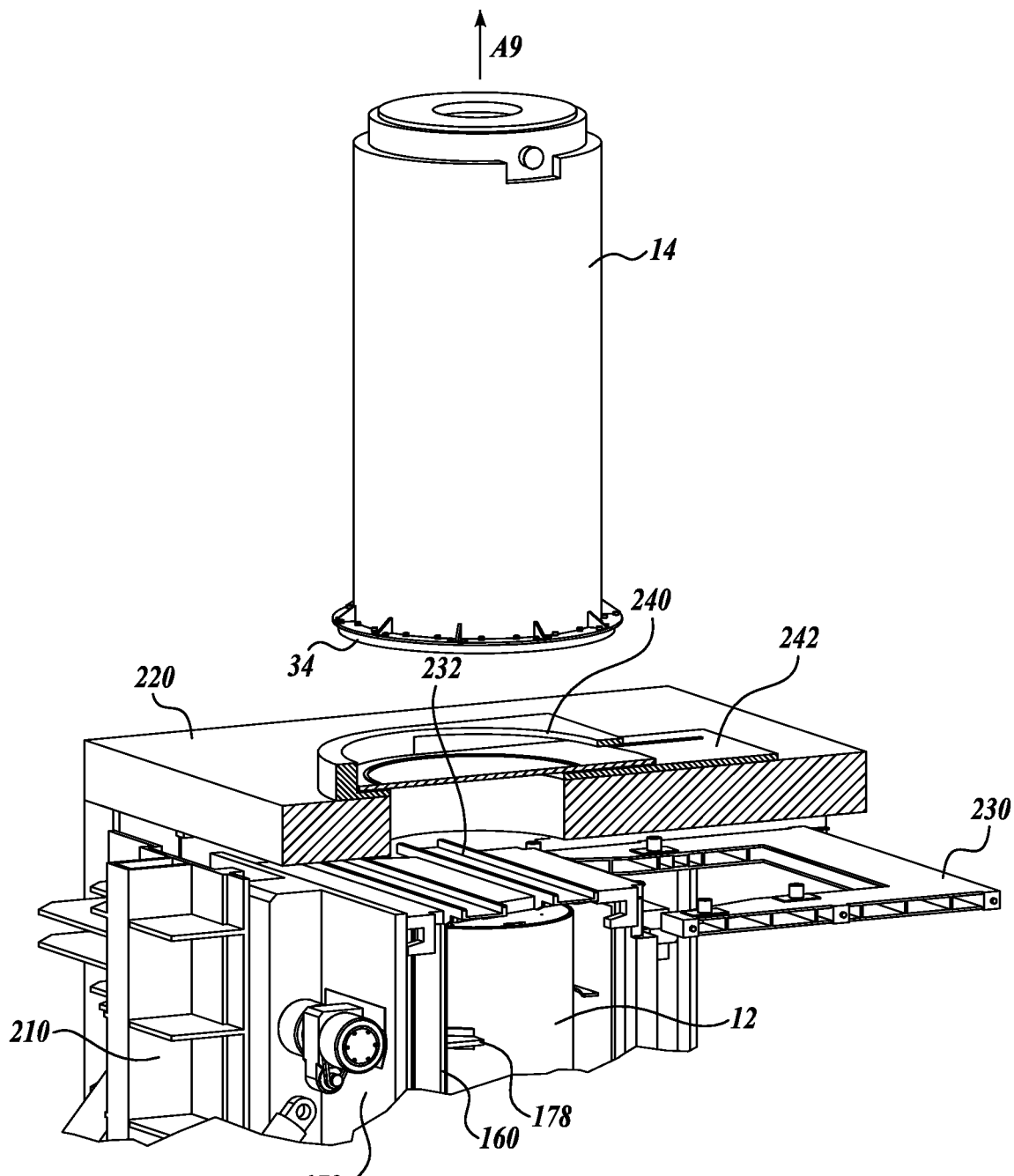

After the vertically oriented canister 12 has been received by the up-ended wagon 170, the wagon door 232 is returned to its closed position in the direction of arrow A7 (see FIG. 25), the sliding platform 242 is returned to its closed position in the direction of arrow A8 (see FIG. 26), and the cask 14 is vertically lifted away from the gantry platform 220 in the direction of arrow A9 (see FIG. 27). Thereafter, the gantry platform 220 is returned to its unengaged position (see FIG. 14), and the wagon 170 can then returned to its horizontal position (see reverse process in series of FIG. 14, 13, 12). In the horizontal position, the canister 12 rests on the transfer skid 160 in the wagon 170, and the wagon 170 can be used to convey the canister 12 to the HSM 120 (see FIG. 5).

Horizontal to Horizontal Transfer Station

Referring now to FIGS. 28-33, a horizontal to horizontal (HTH) transfer station 300 will now be described. The HTH transfer station 300 includes a roller stand 310 for receiving a canister 12 from a horizontally oriented transport cask 14. The HTH transfer station 300 further includes a lift assembly 320 for lifting the canister 12 from the roller stand 310 onto the support structure 160 in the transfer wagon 170.

A ram 324 may be used to move the canister 12 from the horizontally oriented transport cask 14 to the roller stand 310. In previously designed system, rails were used to receive a canister 12. The advantageous effect of a roller stand 310 is that is reduces the chance of scratches to the canister 12, which may provide a weakness in the canister or opportunity for corrosion.

In the illustrated embodiment, the lift assembly 320 is a sling lift. In that regard, lifting straps 322 can be used to lift and move the canister 12. However, other lifts are also within the scope of the present disclosure.

Figure 29:
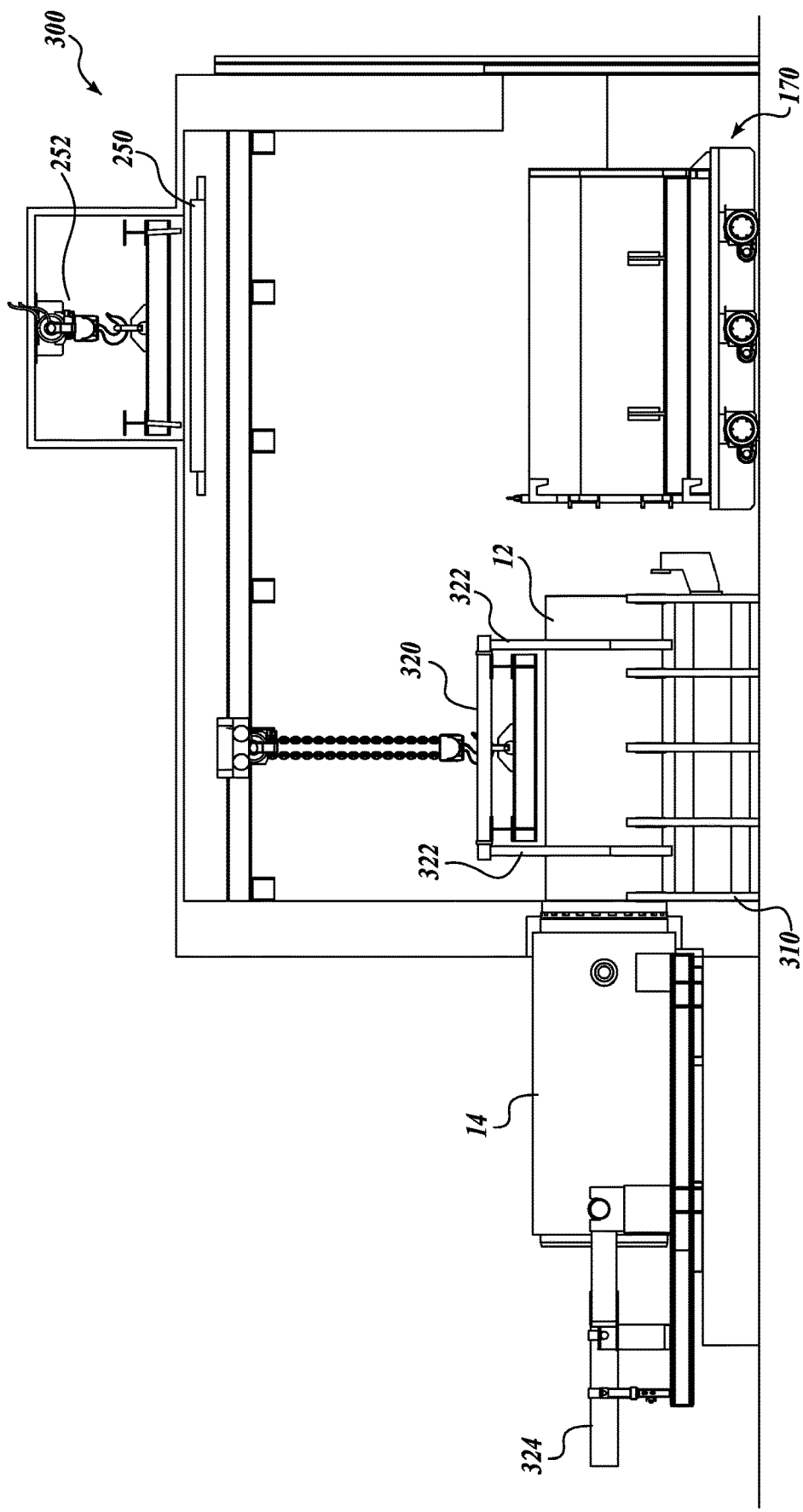
Figure 30:
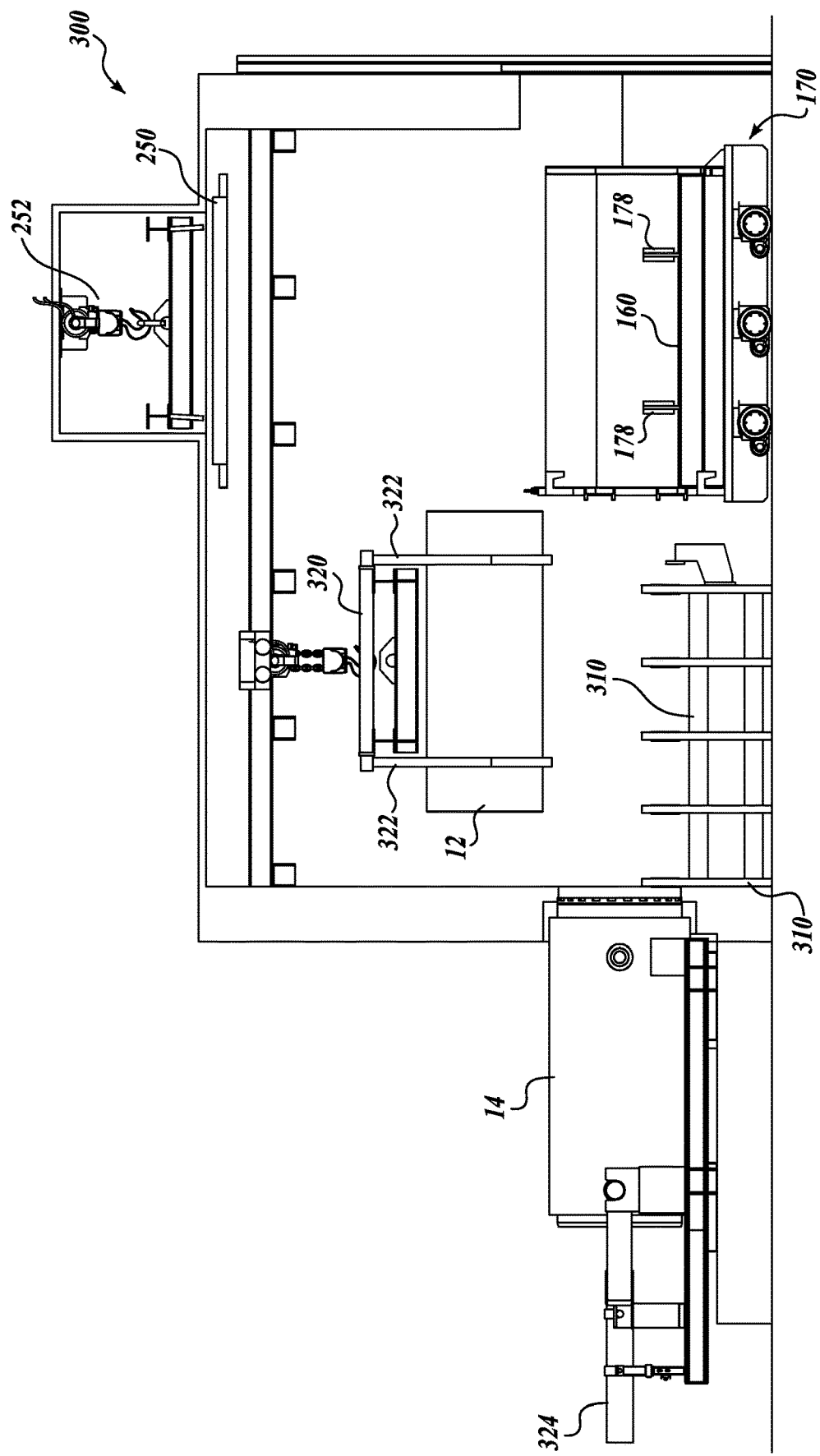
Figure 31:
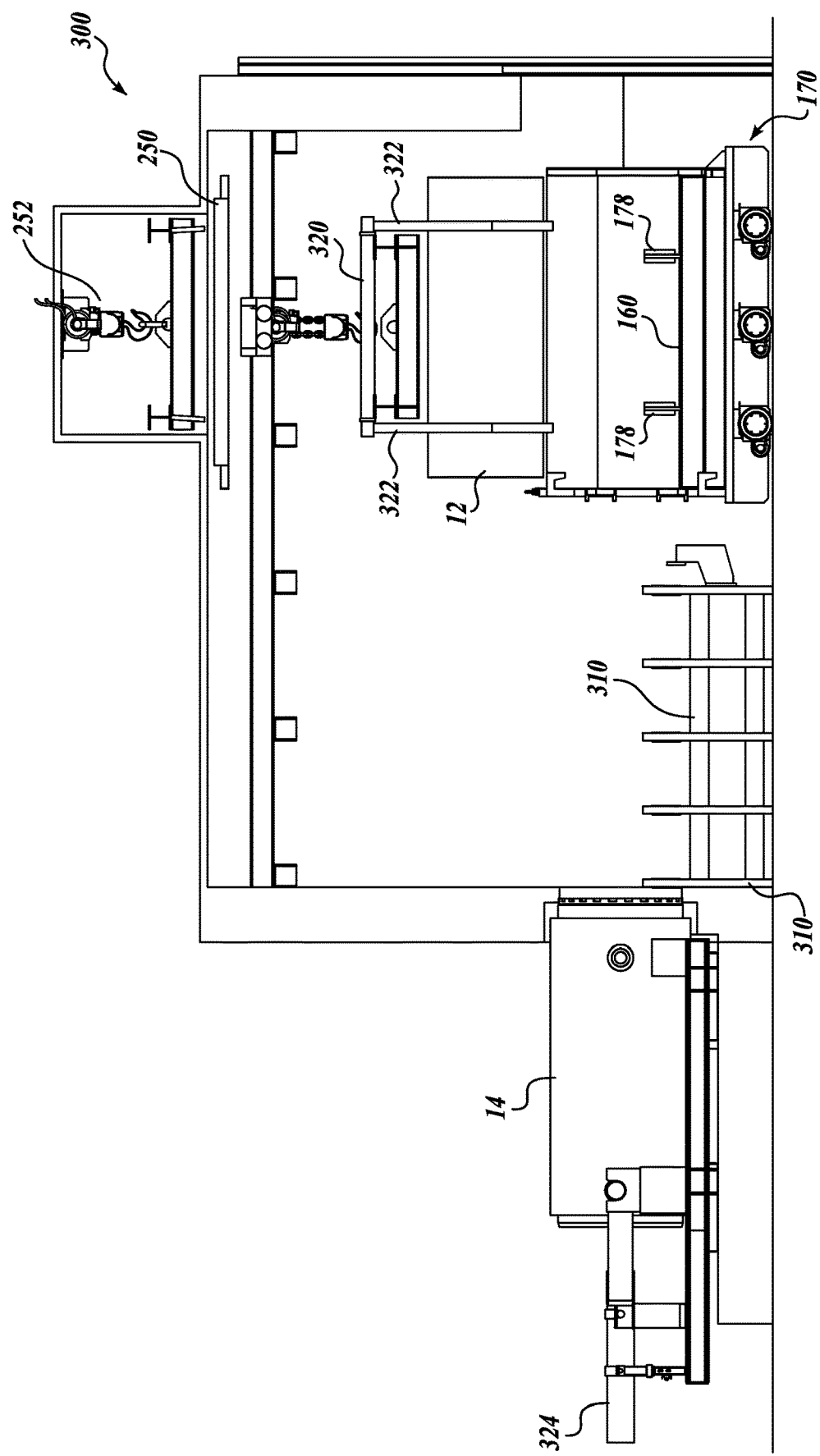

Referring to FIG. 29, canister 12 is received from the cask 14 onto the roller stand 310. Lifting straps 322 are placed around the canister 12 and the canister is lifted using canister lifting device 320. Referring to the sequence of FIGS. 30 and 31, the canister 12 is moved using the canister lifting device 320 from the roller stand 310 to the support structure 160 (or transfer skid) in the transport wagon 170.

Figure 32:
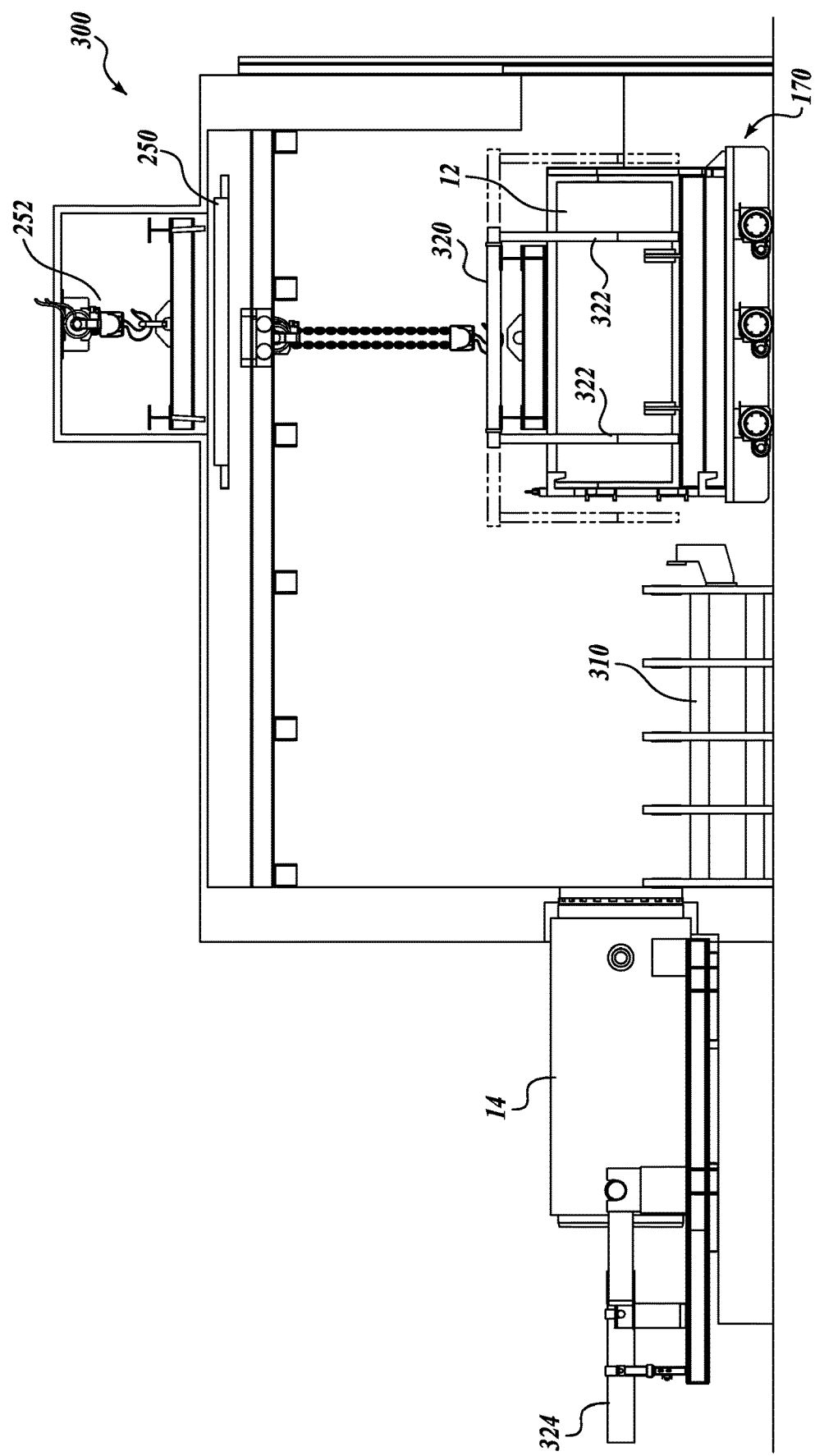
Figure 33:
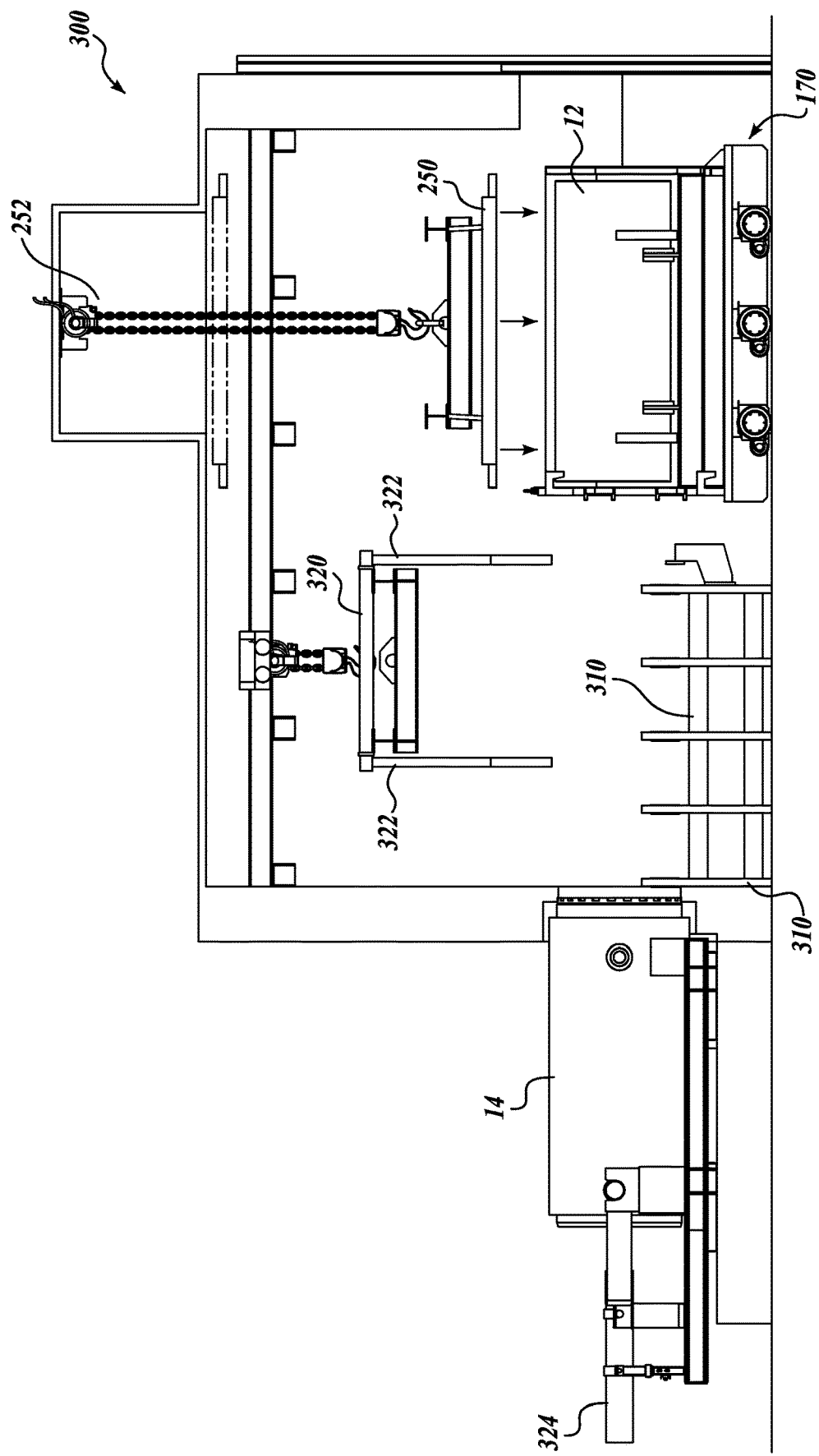

Referring to the sequence of FIGS. 32 and 33, after being placed in the transport wagon 170, lifting straps 322 disengage and are retracted to a position above the roller stand 310.

As seen in FIG. 33, lid 250 from the transport wagon 170, which is shown retracted by lid lift assembly 252 in FIG. 29, is replaced on the transport wagon 170.

While illustrative embodiments have been illustrated and described, it will be appreciated that various changes can be made therein without departing from the spirit and scope of the disclosure.

The embodiments of the disclosure in which an exclusive property or privilege is claimed are defined as follows:

1. A system for transferring a canister containing radioactive material from a cask to a horizontal storage module, the system comprising:
   a transfer station for transferring the canister from the cask to a support structure; and
   a transport conveyance for conveying the canister and the support structure in a horizontal orientation to a horizontal storage module and loading the canister and the support structure into the horizontal storage module;
   wherein the transfer station includes a gantry platform for mating with the transport conveyance when in a vertical orientation, the gantry platform comprising a device for removing a lid on the cask to allow delivery of the canister from the cask.

2. The system of claim 1, wherein the transfer station is a vertical to horizontal transfer station.

3. The system of claim 1, wherein the transfer station includes an up-ender platform to move the transport conveyance to the vertical orientation for receiving the canister.

4. The system of claim 3, wherein the transfer station includes a securement device for securing the transport conveyance on the up-ender platform.

5. The system of claim 1, wherein the gantry platform guides a canister into the conveyance in the vertical orientation.

6. The system of claim 1, wherein the gantry platform includes an aperture through which the canister is delivered.

7. The system of claim 1, wherein the gantry platform includes a device for removing a door on the transport conveyance to allow insertion of the canister in the transport conveyance.

8. The system of claim 3, wherein the up-ender platform is configured to move the transport conveyance from the vertical orientation back to a horizontal orientation.

9. The system of claim 1, wherein the transfer station is a horizontal to horizontal transfer station.

10. The system of claim 9, wherein the transfer station includes a roller stand.

11. The system of claim 9, wherein the transfer station includes a lift assembly.

12. The system of claim 11, wherein the lift assembly is a sling lift assembly.

13. The system of claim 1, wherein the conveyance includes an actuation assembly for moving the canister and the support structure into the horizontal storage module.

14. The system of claim 1, wherein the transport conveyance includes one or more transport conveyance devices.

15. The system of claim 14, wherein the one or more transport conveyance devices are selected from the group consisting of wheels, tracks, rollers, bearing pads, bearing surfaces, air skids, and combinations thereof.

16. The system of claim 1, wherein the transport conveyance includes outer walls.

17. The system of claim 16, wherein the outer walls include shielding material for radiation containment.

18. The system of claim 1, wherein the transport conveyance includes a transfer assembly for loading the canister and the support structure into the horizontal storage module.

19. The system of claim 18, wherein the transfer assembly includes a jack assembly, one or more transfer conveyance devices, and a lateral extender.

20. The system of claim 19, wherein the one or more transfer conveyance devices are selected from the group consisting of wheels, tracks, rollers, bearing pads, bearing surfaces, air skids, and combinations thereof.

21. The system of claim 18, wherein the transfer assembly is hydraulically or electromechanically operated.

22. A system for transferring a canister containing radioactive material from a cask to a horizontal storage module, the system comprising:
- a transfer station for transferring the canister from the cask to a support structure; and
- a transport conveyance for conveying the canister and the support structure in a horizontal orientation to a horizontal storage module and loading the canister and the support structure into the horizontal storage module;
- wherein the transfer station includes a gantry platform for mating with the transport conveyance when in a vertical orientation, the gantry platform comprising a device for removing a door on the transport conveyance to allow insertion of the canister in the transport conveyance.

23. A system for transferring a canister containing radioactive material from a cask to a horizontal storage module, the system comprising:
- a horizontal to horizontal transfer station for transferring the canister from the cask to a support structure; and
- a transport conveyance for conveying the canister and the support structure in a horizontal orientation to a horizontal storage module and loading the canister and the support structure into the horizontal storage module;
- wherein the horizontal to horizontal transfer station comprises a sling lift assembly.

* * * * *